US011888670B1

(12) United States Patent
Meir et al.

(10) Patent No.: US 11,888,670 B1
(45) Date of Patent: Jan. 30, 2024

(54) OVER THE AIR RELIABLE DIGITAL PRE-DISTORTION

(71) Applicant: QUALCOMM Incorporated, San Diego, CA (US)

(72) Inventors: Elad Meir, Ramat Gan (IL); Gideon Shlomo Kutz, Ramat Hasharon (IL); Oren Matsrafi, Karkur (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/869,774

(22) Filed: Jul. 20, 2022

(51) Int. Cl.
*H04B 1/04* (2006.01)
*H04L 27/26* (2006.01)

(52) U.S. Cl.
CPC ....... H04L 27/2623 (2013.01); H04B 1/0475 (2013.01); *H04B 2001/0425* (2013.01)

(58) Field of Classification Search
CPC .......... H04B 1/0475; H04B 2001/0425; H04L 27/2623; H04L 27/2614
USPC .......... 375/219–222, 262, 295–297
See application file for complete search history.

(56) References Cited

U.S. PATENT DOCUMENTS

| | | | | |
|---|---|---|---|---|
| 8,446,979 B1 * | 5/2013 | Yee | ....................... | H03F 1/3258 375/295 |
| 9,008,156 B1 * | 4/2015 | Dick | .................... | H04W 84/047 375/220 |
| 9,337,782 B1 * | 5/2016 | Mauer | ............... | H04L 25/03343 |
| 9,509,350 B1 * | 11/2016 | Magesacher | ............... | H03F 3/24 |
| 10,701,694 B2 * | 6/2020 | Khan | ................ | H04W 72/0453 |
| 2010/0087227 A1 * | 4/2010 | Francos | .................... | H03F 3/24 455/562.1 |
| 2020/0204420 A1 * | 6/2020 | Megretski | ........... | H04L 27/2614 |

FOREIGN PATENT DOCUMENTS

| | | | | |
|---|---|---|---|---|
| EP | 3968589 A1 * | 3/2022 | ......... | H04L 27/2614 |
| WO | WO-2019014422 A1 * | 1/2019 | ............... | H03F 1/32 |
| WO | WO-2021132928 A1 * | 7/2021 | ........... | H04B 1/0475 |

* cited by examiner

*Primary Examiner* — Emmanuel Bayard
(74) *Attorney, Agent, or Firm* — Holland & Hart LLP

(57) ABSTRACT

Methods, systems, and devices for wireless communications are described. Techniques provide for reliable signal processing and amplification of downlink signals. A network entity may apply a digital pre-distortion (DPD) process to a signal for transmission to a user equipment (UE) and may apply a crest factor reduction (CFR) process to the output of the DPD process. The output of the CFR process may be amplified by a power amplifier and transmitted via a downlink transmission to the UE. The CFR process limits the peak power of the signal provided to the power amplifier (e.g., to a configured level), thereby reducing the peak to average power ratio (PAPR) of the signal provided to the power amplifier. The DPD process may compensate for non-linearities of the power amplifier. A training procedure for the DPD process may account for the CFR process applied after the DPD process.

30 Claims, 18 Drawing Sheets

OVER THE AIR RELIABLE DIGITAL PRE-DISTORTION

FIELD OF TECHNOLOGY

The following relates to wireless communications, including over the air reliable digital pre-distortion.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support over the air reliable digital pre-distortion (DPD). For example, the described techniques provide for reliable signal processing and amplification of downlink signals. A network entity may apply a DPD process to a signal for transmission to a user equipment (UE) and may apply a crest factor reduction (CFR) process to the output of the DPD process. The output of the CFR process may be amplified by a power amplifier and transmitted via a downlink transmission to the UE. The CFR process limits the peak power of the signal provided to the power amplifier (e.g., to a configured level), thereby reducing the peak to average power ratio (PAPR) of the signal provided to the power amplifier. The DPD process may compensate for non-linearities of the power amplifier. A training procedure for the DPD process may account for the CFR process applied after the DPD process.

A method for wireless communications at a network entity is described. The method may include performing a signal processing procedure on an input signal to generate an output signal, performing the signal processing procedure including, performing a DPD on the input signal according to a set of DPD coefficients to compensate for a distortion of a power amplifier, performing a CFR process on the input signal subsequent to performing the DPD, amplifying the output signal via the power amplifier to generate an amplified signal, and transmitting, to a user equipment (UE), the amplified signal via one or more antennas.

An apparatus for wireless communications at a network entity is described. The apparatus may include a processor, memory coupled with the processor, and instructions stored in the memory. The instructions may be executable by the processor to cause the apparatus to perform a signal processing procedure on an input signal to generate an output signal, performing the signal processing procedure including, perform a DPD on the input signal according to a set of DPD coefficients to compensate for a distortion of a power amplifier, perform a CFR process on the input signal subsequent to performing the DPD, amplify the output signal via the power amplifier to generate an amplified signal, and transmit, to a UE, the amplified signal via one or more antennas.

Another apparatus for wireless communications at a network entity is described. The apparatus may include means for performing a signal processing procedure on an input signal to generate an output signal, performing the signal processing procedure including, means for performing a DPD on the input signal according to a set of DPD coefficients to compensate for a distortion of a power amplifier, means for performing a CFR process on the input signal subsequent to performing the DPD, means for amplifying the output signal via the power amplifier to generate an amplified signal, and means for transmitting, to a UE, the amplified signal via one or more antennas.

A non-transitory computer-readable medium storing code for wireless communications at a network entity is described. The code may include instructions executable by a processor to perform a signal processing procedure on an input signal to generate an output signal, performing the signal processing procedure including, perform a DPD on the input signal according to a set of DPD coefficients to compensate for a distortion of a power amplifier, perform a CFR process on the input signal subsequent to performing the DPD, amplify the output signal via the power amplifier to generate an amplified signal, and transmit, to a UE, the amplified signal via one or more antennas.

Some examples of the method, apparatuses, and non-transitory computer-readable medium described herein may further include operations, features, means, or instructions for identifying the set of DPD coefficients based on performing a training process for the DPD.

In some examples of the method, apparatuses, and non-transitory computer-readable medium described herein, performing the training process may include operations, features, means, or instructions for transmitting, to the UE, control information indicative of a set of training values including a set of CFR parameters associated with performing the CFR process, transmitting, to the UE, a reference signal, and receiving, from the UE, the set of DPD coefficients identified at the UE based on the set of training values and the reference signal.

Some examples of the method, apparatuses, and non-transitory computer-readable medium described herein may further include operations, features, means, or instructions for receiving, from the UE, control information indicative of a capability of the UE to identify sets of DPD coefficients accounting for the CFR process subsequent to the DPD, where performing the training process may be based on the control information.

Some examples of the method, apparatuses, and non-transitory computer-readable medium described herein may further include operations, features, means, or instructions for transmitting, to the UE, an indication of a configured training signal, where the reference signal includes the configured training signal.

In some examples of the method, apparatuses, and non-transitory computer-readable medium described herein, the set of CFR parameters includes at least one of a polar clipping parameter, a cartesian clipping parameter, a maximal peak power, an input root mean square to the power amplifier, or a target PAPR.

In some examples of the method, apparatuses, and non-transitory computer-readable medium described herein, performing the signal processing procedure may include operations, features, means, or instructions for clipping, via applying the CFR process, the output signal to a configured peak power level.

Some examples of the method, apparatuses, and non-transitory computer-readable medium described herein may further include operations, features, means, or instructions for applying the CFR process may be based on a set of CFR parameters including one or more clipping parameters.

In some examples of the method, apparatuses, and non-transitory computer-readable medium described herein, performing the signal processing procedure may include operations, features, means, or instructions for performing a second CFR process prior to the DPD.

In some examples of the method, apparatuses, and non-transitory computer-readable medium described herein, the second CFR process may be configured match a complementary cumulative distribution function of the input signal and the output signal.

A method for wireless communications at a UE is described. The method may include receiving, from a network entity, control information indicative of a set of training values for a DPD associated with the network entity, the set of training values including a set of CFR parameters for a CFR process associated with the network entity, receiving, from the network entity, a reference signal, determining a set of DPD coefficients associated with the DPD based on the set of training values and the reference signal, and transmitting, to the network entity, an indication of the set of DPD coefficients.

An apparatus for wireless communications at a UE is described. The apparatus may include a processor, memory coupled with the processor, and instructions stored in the memory. The instructions may be executable by the processor to cause the apparatus to receive, from a network entity, control information indicative of a set of training values for a DPD associated with the network entity, the set of training values including a set of CFR parameters for a CFR process associated with the network entity, receive, from the network entity, a reference signal, determine a set of DPD coefficients associated with the DPD based on the set of training values and the reference signal, and transmit, to the network entity, an indication of the set of DPD coefficients.

Another apparatus for wireless communications at a UE is described. The apparatus may include means for receiving, from a network entity, control information indicative of a set of training values for a DPD associated with the network entity, the set of training values including a set of CFR parameters for a CFR process associated with the network entity, means for receiving, from the network entity, a reference signal, means for determining a set of DPD coefficients associated with the DPD based on the set of training values and the reference signal, and means for transmitting, to the network entity, an indication of the set of DPD coefficients.

A non-transitory computer-readable medium storing code for wireless communications at a UE is described. The code may include instructions executable by a processor to receive, from a network entity, control information indicative of a set of training values for a DPD associated with the network entity, the set of training values including a set of CFR parameters for a CFR process associated with the network entity, receive, from the network entity, a reference signal, determine a set of DPD coefficients associated with the DPD based on the set of training values and the reference signal, and transmit, to the network entity, an indication of the set of DPD coefficients.

Some examples of the method, apparatuses, and non-transitory computer-readable medium described herein may further include operations, features, means, or instructions for transmitting, to the network entity, control information indicative of a capability of the UE to identify sets of digital pre-distortion coefficients accounting for the CFR process subsequent to the DPD.

Some examples of the method, apparatuses, and non-transitory computer-readable medium described herein may further include operations, features, means, or instructions for receiving, from the network entity, an indication of a configured training signal, where the reference signal includes the configured training signal.

In some examples of the method, apparatuses, and non-transitory computer-readable medium described herein, the set of CFR parameters includes at least one of a polar clipping parameter, a cartesian clipping parameter, a maximal peak power, an input root mean square to a power amplifier, or a target PAPR.

Some examples of the method, apparatuses, and non-transitory computer-readable medium described herein may further include operations, features, means, or instructions for receiving, from the network entity, a downlink transmission based on transmitting the indication of the set of DPD coefficients.

DETAILED DESCRIPTION

Figure 1:
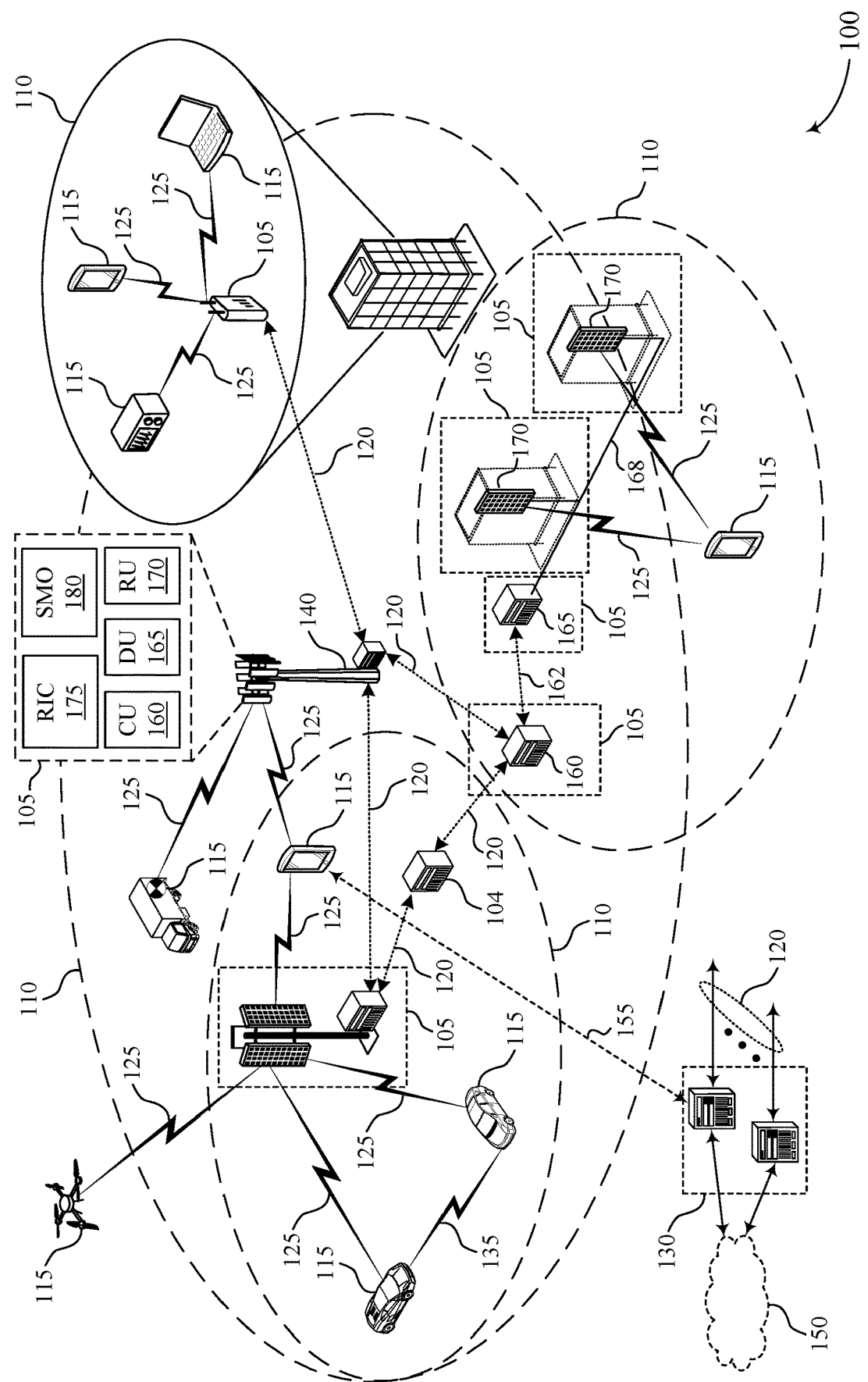
FIG. 1 illustrates an example of a wireless communications system that supports over the air reliable digital pre-distortion (DPD) in accordance with one or more aspects of the present disclosure.

Some wireless communications systems may implement orthogonal frequency-division multiple access (OFDMA), which may enable simple channel estimation at the receiver and flexibility in utilization of available time and frequency resources. OFDMA, however, may be associated with a higher peak to average power ratio (PAPR) as compared to single carrier techniques. Power amplifiers used at network entities to amplify signals for transmissions may have a dynamic range, and signals near or at a saturation power level of the power amplifiers may be distorted by nonlinearities of the power amplifiers. To prevent nonlinear distortion, a power backoff may be introduced to prevent a power amplifier from operating in a nonlinear region. Power backoff, however, reduces transmission power efficiency. Power backoff may be reduced by performing a digital pre-distortion (DPD) process at a network entity to compensate for non-linearities of the power amplifiers. DPD schemes, however, increase PAPR at the power amplifier input, which may impact the reliability of the power amplifier and reduce the lifetime of the power amplifier.

Aspects of the present disclosure relate to the performance of a crest factor reduction (CFR) process on a signal after the DPD process. A network entity may apply a DPD process to a signal and apply a CFR process to the output of the DPD process. The output of the CFR process may be amplified by a power amplifier and transmitted via a downlink transmission to a user equipment (UE). The CFR process limits the peak power of the signal provided to the power amplifier (e.g., to a configured level), thereby reducing the PAPR of the signal provided to the power amplifier. By reducing the PAPR of the signal provided to the power amplifier, the reliability and lifetime of the power amplifier may be increased. Another CFR process may be applied to the signal before the DPD process is applied to the signal. The first CFR process (e.g., before the DPD process) matches the signal complementary cumulative distribution function (CCDF) before and after the DPD process. The training procedure for the DPD process may account for the CFR process applied after the DPD process. Accordingly, in a training process, the network entity may transmit a set of training values including parameters for the CFR process to a UE. Parameters for the CFR process may include a polar clipping parameter, a cartesian clipping parameter, a maximal peak power, an input root mean square to the power amplifier, or a target peak to average power ratio. The network entity may transmit a known reference signal to the UE, and the UE may determine a set of DPD parameters (e.g., nonlinear coefficients that are applied during the DPD process) based on the reference signal and the training process. Thus, the UE may account for the CFR process when determining the DPD coefficients. The UE may report the DPD coefficients to the network entity.

Aspects of the disclosure are initially described in the context of wireless communications systems. Aspects of the disclosure are further illustrated by and described with reference to signal processing procedures, signaling diagrams, and process flows. Aspects of the disclosure are further illustrated by and described with reference to apparatus diagrams, system diagrams, and flowcharts that relate to over the air reliable DPD.

FIG. 1 illustrates an example of a wireless communications system 100 that supports over the air reliable DPD in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115)

within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support over the air reliable DPD as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may implement OFDMA, for example for downlink communications from a network entity 105 to a UE 115. OFDMA may use higher order constellations such as 256 quadrature amplitude modulation (QAM), 1024 QAM, or 16 KQAM. Achieving the high error vector magnitude (EVM) performance demanded for high constellation values may result in high power consumption. In addition, OFDMA may be associated with a higher PAPR as compared to single carrier techniques. High power amplifiers at network entities 105 with limited linear dynamic range may generate nonlinear components and thus distort transmitted signals (e.g., downlink signals transmitted to UEs 115). Nonlinear distortion may be classified as in-band distortion, which is associated with EVM, or out of band emissions, which is associated with an adjacent channel leakage ratio (ACLR). To avoid these nonlinear distortions, power backoff may be applied. Power backoff may prevent a power amplifier from operating in a nonlinear region. However, power backoff is inversely related to power efficiency, and accordingly the higher the power backoff applied, the lower the amount of power of a signal that is transmitted on a channel.

A DPD process or a digital post-distortion (DPoD) process may be used to keep the amount of distortion at a target level. When using a DPD process or a DPoD process, the power amplifier at the network entity 105 may be able to operate in a nonlinear region. When using a DPD process or a DPoD process, power backoff may be reduced (e.g., as low as possible), an therefore a DPD process or a DPoD process may enable a working point with a higher power efficiency. Accordingly, a DPD process or a DPoD process may allow for a larger power gain without compromising EVM.

DPD schemes, however, increase PAPR at the power amplifier input. Additionally, DPD schemes may be associated with an increase in the signal root mean square (RMS), because the amplifier may operate in a more compressed nonlinear region due to the DPD. High PAPR and increased RMS may cause instantaneous power peaks at the power amplifier, which may impact the reliability of the power amplifier and reduce the lifetime of the power amplifier. In some systems, an additional 1-2 dB of power gains could have been demonstrated if reliability concerns of the power amplifiers were not a concern.

Accordingly, a network entity 105 may apply a CFR process after the DPD process before amplifying a signal using a power amplifier. A network entity 105 may apply a DPD process to a signal and apply a CFR process to the output of the DPD process. The output of the CFR process may be amplified by a power amplifier and transmitted via a downlink transmission to a UE 115. The CFR process limits the peak power of the signal provided to the power amplifier (e.g., to a configured level), thereby reducing the PAPR of the signal provided to the power amplifier. By reducing the PAPR of the signal provided to the power amplifier, the reliability and lifetime of the power amplifier may be increased. Another CFR process may be applied to the signal before the DPD process is applied to the signal. The first CFR process (e.g., before the DPD process) matches the signal CCDF before and after the DPD process.

A network entity 105 may perform a training procedure for the DPD process that may account for the CFR process applied after the DPD process. Accordingly, in a training process, the network entity 105 may transmit a set of training values including parameters for the CFR process to a UE 115. Parameters for the CFR process may include a polar clipping parameter, a cartesian clipping parameter, a maximal peak power, an input root mean square to the power amplifier, or a target peak to average power ratio. The network entity 105 may transmit a known reference signal to the UE 115, and the UE 115 may determine a set of DPD coefficients (e.g., nonlinear coefficients that are applied during the DPD process) based on the reference signal and the training process. Thus, the UE 115 may account for the CFR process when determining the DPD parameters (e.g., the DPD coefficients). The UE 115 may report the DPD parameters to the network entity 105. The network entity 105 may perform the DPD and CFR processes based on the training process for downlink transmissions to the UE 115 that participated in the training process as well as for downlink transmissions with other UEs 115.

Figure 2:
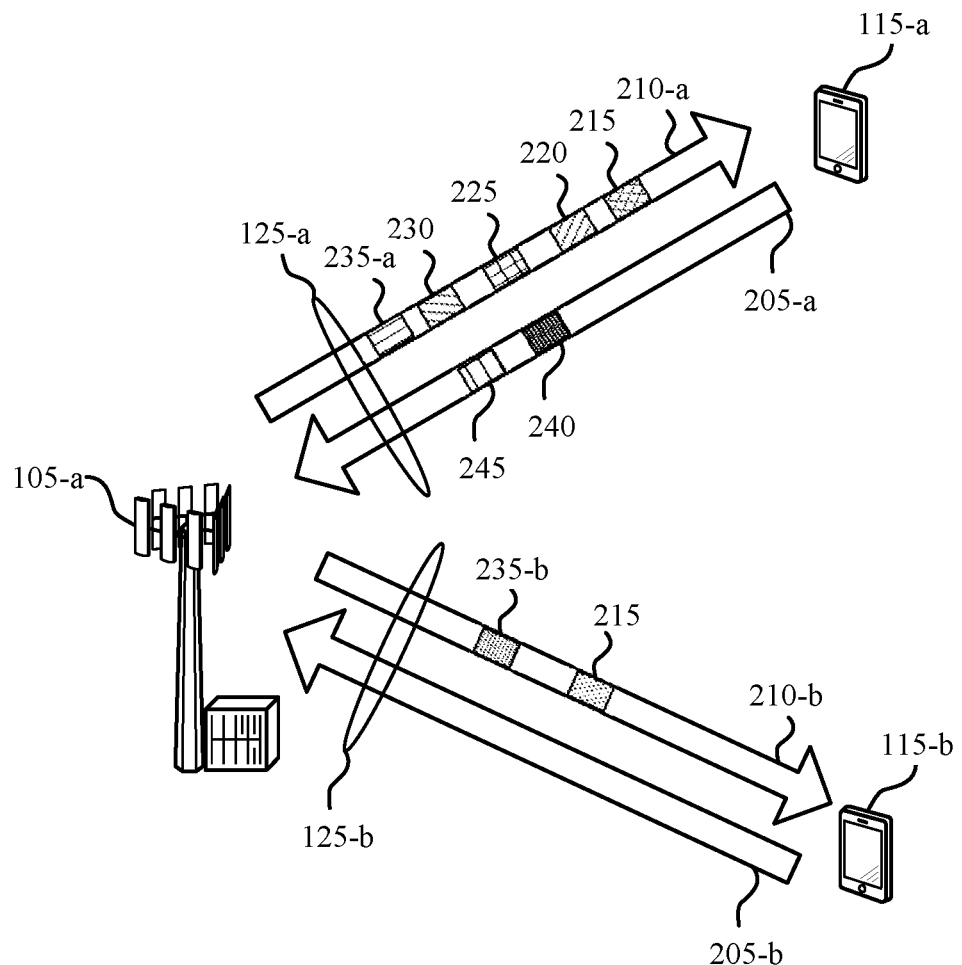
FIG. 2 illustrates an example of a wireless communications system that supports over the air reliable DPD in accordance with one or more aspects of the present disclosure.

FIG. 2 illustrates an example of a wireless communications system 200 that supports over the air reliable DPD in accordance with one or more aspects of the present disclosure. In some examples, the wireless communications system 200 may implement aspects of wireless communications system 100. The wireless communications system 200 may include a UE 115-a and a UE 115-b, which may be examples of a UE 115 as described herein. The wireless communications system 200 may include a network entity 105-a, which may be an example of a network entity 105 as described herein.

The UE 115-a may communicate with the network entity 105-a using a communication link 125-a, which may be examples of NR or LTE links between the UE 115-a and the network entity 105-a. The UE 115-b may communicate with the network entity 105-a using a communication link 125-b, which may be examples of NR or LTE links between the UE 115-b and the network entity 105-a. The communication link 125-a and the communication link 125-b may include bi-directional links that enables both uplink and downlink communication. For example, the UE 115-a may transmit uplink signals 205-a, such as uplink control signals or uplink data signals, to the network entity 105-a using the communication link 125-a and the network entity 105-a may transmit downlink signals 210-a, such as downlink control signals or downlink data signals, to the UE 115-a using the communication link 125-a. For example, the UE 115-b may transmit uplink signals 205-b, such as uplink control signals or uplink data signals, to the network entity 105-a using the communication link 125-b and the network entity 105-a may transmit downlink signals 210-b, such as downlink control signals or downlink data signals, to the UE 115-b using the communication link 125-b.

The network entity 105-a may amplify signals using a power amplifier prior to transmission of the signals in downlink transmissions (e.g., a downlink transmission 235-a to the UE 115-a or a downlink transmission 235-b to the UE 115-b). As described herein, the network entity 105-a may perform signal processing that includes a DPD process and a CFR process subsequent to the DPD process prior to inputting a signal to the power amplifier in order to compensate for non-linearities of the power amplifier and reduce the PAPR of the input signal to the power amplifier. The network entity 105-a may perform a training process for the DPD process.

For example, the network entity 105-a may transmit a message 215 requesting a UE to assist in a training process. The message 215 may request for a UE to respond if the UE is capable of identifying sets of DPD coefficients while accounting for a CFR process subsequent to the DPD process.

The UE 115-a may transmit, to the network entity 105-a, control information 240 indicating the UE 115-a is capable of identifying sets of DPD coefficients while accounting for a CFR process subsequent to the DPD process.

The network entity 105-a may transmit control information 220 indicating a set of training values for a DPD process associated with the network entity 105-a. The set of training values may include a set of CFR parameters for a CFR process associated with the network entity 105-a.

The network entity 105-a may transmit a reference signal 225 to the UE 115-a. In some cases, the network entity 105-a may transmit a message 230 indicating a configured training signal, and the reference signal 225 may be the configured training signal.

The UE 115-a may determine the DPD coefficients for the DPD process based on the training values and the reference signal. The UE 115-*a* may transmit a message 245 indicating the determined DPD coefficients to the network entity 105-*a*.

The network entity 105-*a* may use the determined DPD coefficients for the DPD process for a downlink transmission 235-*a* to the UE 115-*a* that assisted in the training procedure or in downlink transmissions to other UEs that did not assist in the training procedure, such as in a downlink transmission 235-*b* to the UE 115-*b*.

In some cases, the DPD coefficients may be a set of non-linearity coefficients, g. To determine the set of non-linearity coefficients, g, the network entity 105-*a* may determine arg $\min_g \|w(Ag-y)\|^2$, where g may be a non-linearity coefficients vector to be calculated (e.g., DPD coefficients), A may be a matrix whose columns represent non-linear kernels and whose rows each represent one equation (e.g., a time domain sample or a frequency domain bin), y may be a target vector whose elements each represent a target per equation (e.g., a time domain sample of frequency domain bin target), and w may be a weight diagonal matrix. The weight diagonal matrix may be configured to manage (e.g., optimize) performance of different frequency regions. For instance, the weight diagonal matrix may be configured to manage (e.g., optimize) in-band distortions (e.g., distortions related to EVM or out of band distortions (e.g., ACLR).

The UE 115-*a* (or multiple UEs in the case that multiple UEs participate in the DPD training process) may provide results for a subset of the equations (e.g., based on a subset of A, y, and w). For instance, $$\arg\min_g \|w(Ag-y)\|^2 = \arg\min_g \left\| \begin{bmatrix} w_0 & \cdots & \\ \vdots & \ddots & \vdots \\ & \cdots & w_{N-1} \end{bmatrix} \left( \begin{bmatrix} A_0 \\ \vdots \\ A_{N-1} \end{bmatrix} g - \begin{bmatrix} y_0 \\ \vdots \\ y_{N-1} \end{bmatrix} \right) \right\|^2,$$

where an nth UE (e.g., the UE 115-*a*) may generate its subset of equations based on $w_n$, $A_n$, and $y_n$. The UE 115-*a* may account for the CFR parameters indicated in the control information 220 when generating the subset of equations based on $w_n$, $A_n$, and $y_n$. In some examples, the network entity 105-*a* may determine the set of non-linearity coefficients g as $g=(\Sigma_n A_n^H w_n A_n)^{-1}(\Sigma_n A_n^H w_n y_n)$. Accordingly, the UE 115-*a* may signal one or more of $B_n = A_n^H w_n A_n$ and $z_n = A_n^H w_n y_n$ in the one or more DPD parameters.

Once the network entity 105-*a* receives the one or more DPD parameters from the UE 115-*a* (or multiple UEs 115 if multiple UEs are used for training the DPD process), the network entity 105-*a* may calculate g as $g=(\Sigma_n v_n B_n)^{-1}(\Sigma_n v_n z_n)$, where $v_n$ may be a scalar per UE 115 that represents a quality metric that the network entity 105-*a* is to apply on each UE 115 to normalize a size of the subset of data that a UE 115 has used or to represent different SNRs for different UEs. n may be one in the case that a single UE 115 (e.g., UE 115-*a*) is used for training the DPD process.

Figure 3:
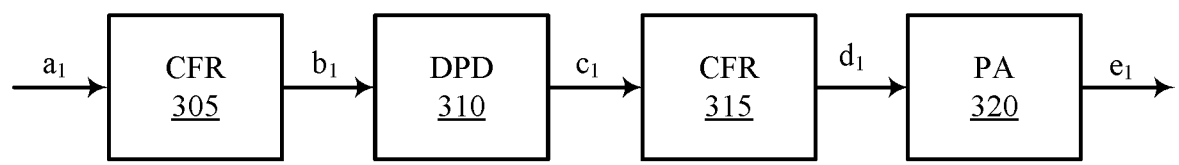
FIG. 3 illustrates an example of a signal processing procedure that supports over the air reliable DPD in accordance with one or more aspects of the present disclosure.

FIG. 3 illustrates an example of a signal processing procedure 300 that supports over the air reliable DPD in accordance with one or more aspects of the present disclosure. In some examples, the signal processing procedure 300 may be implemented by aspects of wireless communications system 100 or the wireless communications system 200. For example, the signal processing procedure 300 may be implemented by a network entity 105 as described herein.

The signal processing procedure, which may for example be performed by a network entity 105 on a signal to be transmitted as a downlink transmission, may include a first CFR process 305, a DPD process 310, a second CFR process 315, and a power amplifier 320.

An input signal $a_1$ may be input to the first CFR process 305, which may generate a signal $b_1$. The signal $b_1$ may be input to the DPD process 310, which may generate a signal $c_1$. The signal $c_1$ may be input to the second CFR process 315, which may generate a signal $d_1$. The signal $d_1$ may be amplified by the power amplifier 320, generating an amplified signal $e_1$. The amplified signal may be transmitted by a network entity 105, for example in a downlink transmission.

The first CFR process 305 may be used for signal optimization, for example the first CFR process 305 may match the signal CCDF distribution before and after the DPD process 310 (e.g., the first CFR process 305 may match the CCDF distribution of $b_1$ and $c_1$).

The DPD process 310 may distort the signal $b_1$ (e.g., $c_1$ may be a distorted signal) before the signal is input to the power amplifier 320 in order to pre-compensate for the non-linear response of the power amplifier 320.

The second CFR process 315 may limit the peak power of the signal $d_1$ that is input to the power amplifier while keeping EVM to a configured level, which may increase the reliability of the power amplifier 320 and increase the lifetime of the power amplifier 320.

Figure 4:
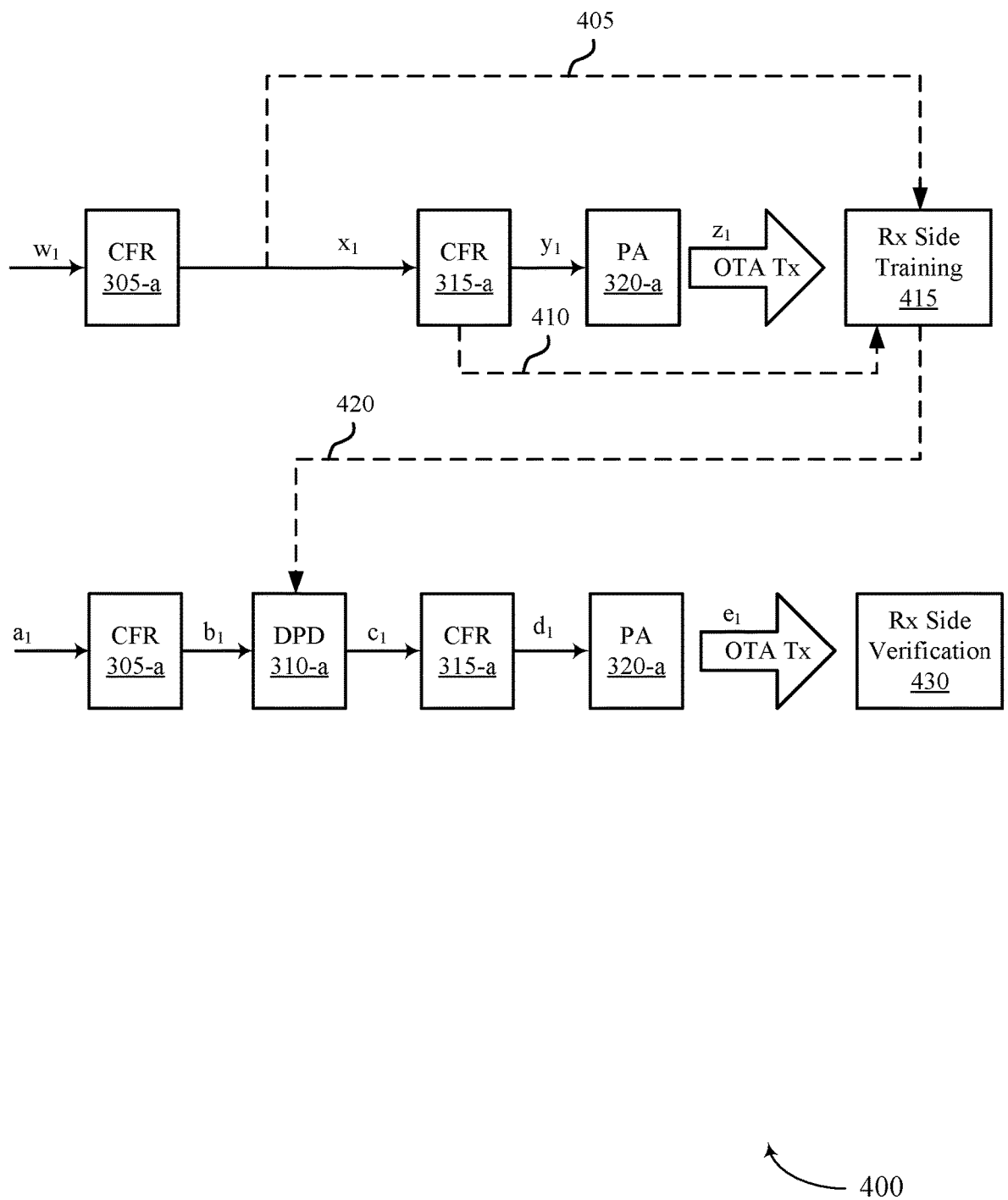
FIG. 4 illustrates an example of a signaling diagram that supports over the air reliable DPD in accordance with one or more aspects of the present disclosure.

FIG. 4 illustrates an example of a signaling diagram 400 that supports over the air reliable DPD in accordance with one or more aspects of the present disclosure. In some examples, the signaling diagram 400 may implement or be implemented by aspects of wireless communications system 100 or the wireless communications system 200. For example, the signaling diagram 400 may be implemented by a UE 115 and/or a network entity 105 as described herein.

A network entity 105 may perform a training process with a UE 115 for a DPD process. For example, for an input signal $w_1$, the network entity 105 may perform a first CFR process 305-*a* on the input signal $w_1$. The network entity 105 may transmit a message 405 indicating the known signal $x_1$, which may be an output of the first CFR process 305-*a*, to a UE 115. The network entity 105 may perform a second CFR process 315-*a* using a set of CFR parameters on the signal $x_1$ to generate a signal $y_1$. The signal $y_1$ may be amplified by a power amplifier 320-*a*, and the amplified signal $z_1$ may be transmitted over the air to a receiver (e.g., a UE 115). The network entity 105 may indicate the CFR parameters in a message 410. Each of the first CFR process and the second CFR process may apply respective static and/or dynamic CFR parameters. The CFR parameters may include a type of clipping applied (e.g., polar clipping or cartesian clipping), a type of threshold (e.g., maximal peak power, input RMS to the power amplifier 320-*a*, or a target PAPR), and the threshold level (e.g., the maximal peak power level, the input RMS level, or the target PAPR level). The static parameters may include the type of clipping and threshold, and the dynamic parameters may include the threshold level.

Based on the actual signal $z_1$ received by the receiver, the indication of the known signal $x_1$, and the indicated CFR parameters, the receiver may determine, via a DPD training process 415, a set of DPD parameters and/or an estimated effective power amplifier model. Indicating the CFR parameters in the message 410 may enable the receiver to account for the CFR subsequent to the DPD process when calculating the DPD parameters. The message 410 may indicate the static and/or dynamic parameters of the second CFR process 315-*a*. The receiver may indicate, in a message 420, the set of DPD parameters and/or an estimated effective power amplifier model.

The network entity 105 may perform the first CFR process 305-*a* on an input signal $a_1$ to generate a signal $b_1$.

The signal $b_1$ may be input to a DPD process 310-a to generate a signal $c_1$. The DPD process 310-a may be based on the of DPD parameters and/or the estimated effective power amplifier model indicated in the message 420. The network entity 105 may perform the second CFR process 315-a on the signal $c_1$ to generate a signal $d_1$. The signal $d_1$ may be amplified by the power amplifier 320-a to generate an amplified signal $e_1$. The amplified signal $e_1$ may be transmitted over the air to a receiver (e.g., a UE 115). The receiver may perform a DPD verification process 430 to determine whether $e_1$ matches an expected signal. The receiver may transmit an acknowledgment if the DPD verification process is successful. The receiver may transmit a negative acknowledgement if the DPD verification process is unsuccessful.

Figure 5:
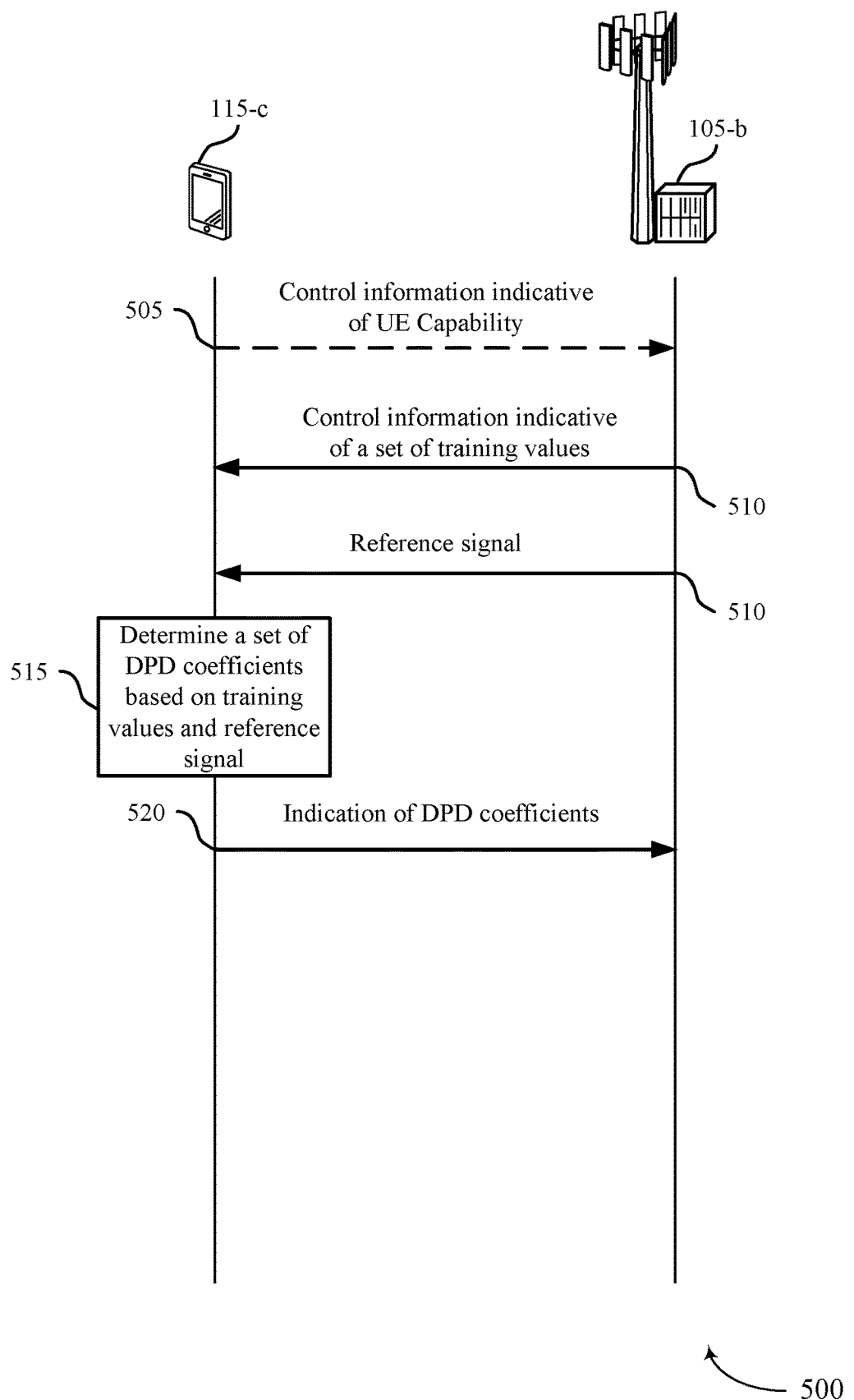
FIG. 5 illustrates an example of a process flow that supports over the air reliable DPD in accordance with one or more aspects of the present disclosure.

FIG. 5 illustrates an example of a process flow 500 that supports over the air reliable DPD in accordance with one or more aspects of the present disclosure. The process flow 500 may include a UE 115-c, which may be an example of a UE 115 as described herein. The process flow 500 may include a network entity 105-b, which may be an example of a network entity 105 as described herein. In the following description of the process flow 500, the operations between the network entity 105-b and the UE 115-c may be transmitted in a different order than the example order shown, or the operations performed by the network entity 105-b and the UE 115-c may be performed in different orders or at different times. Some operations may also be omitted from the process flow 500, and other operations may be added to the process flow 500.

In some cases, at 505, the UE 115-c may transmit, to the network entity 105-b, control information indicative of a capability of the UE 115-c to identify sets of DPD coefficients accounting for a CFR process subsequent to the DPD process. In some cases, the UE 115-c may transmit the control information in response to a message transmitted by the network entity 105-b requesting a UE to assist in DPD training.

At 510, the UE 115-c may receive, from the network entity 105-b, control information indicative of a set of training values for the DPD process associated with the network entity 105-b, the set of training values including a set of CFR parameters for a CFR process associated with the network entity 105-b. In some cases, the set of CFR parameters may include at least one of a polar clipping parameter, a cartesian clipping parameter, a maximal peak power, an input RMS to a power amplifier, or a target PAPR.

At 515, the UE 115-c may receive, from the network entity 105-b, a reference signal. In some cases, the UE 115-c may receive, prior to receiving the reference signal, an indication of a configured training signal, and the reference signal may be the configured training signal.

At 520, the UE 115-c may determine a set of DPD coefficients associated with the DPD process based on the set of training values and the reference signal.

At 525, the UE 115-c may transmit, to the network entity 105-b, an indication of the set of DPD coefficients.

As described with reference to FIG. 6, the UE 115-c may receive, from the network entity 105-b, a downlink transmission based on transmitting the indication of the set of DPD coefficients.

Figure 6:
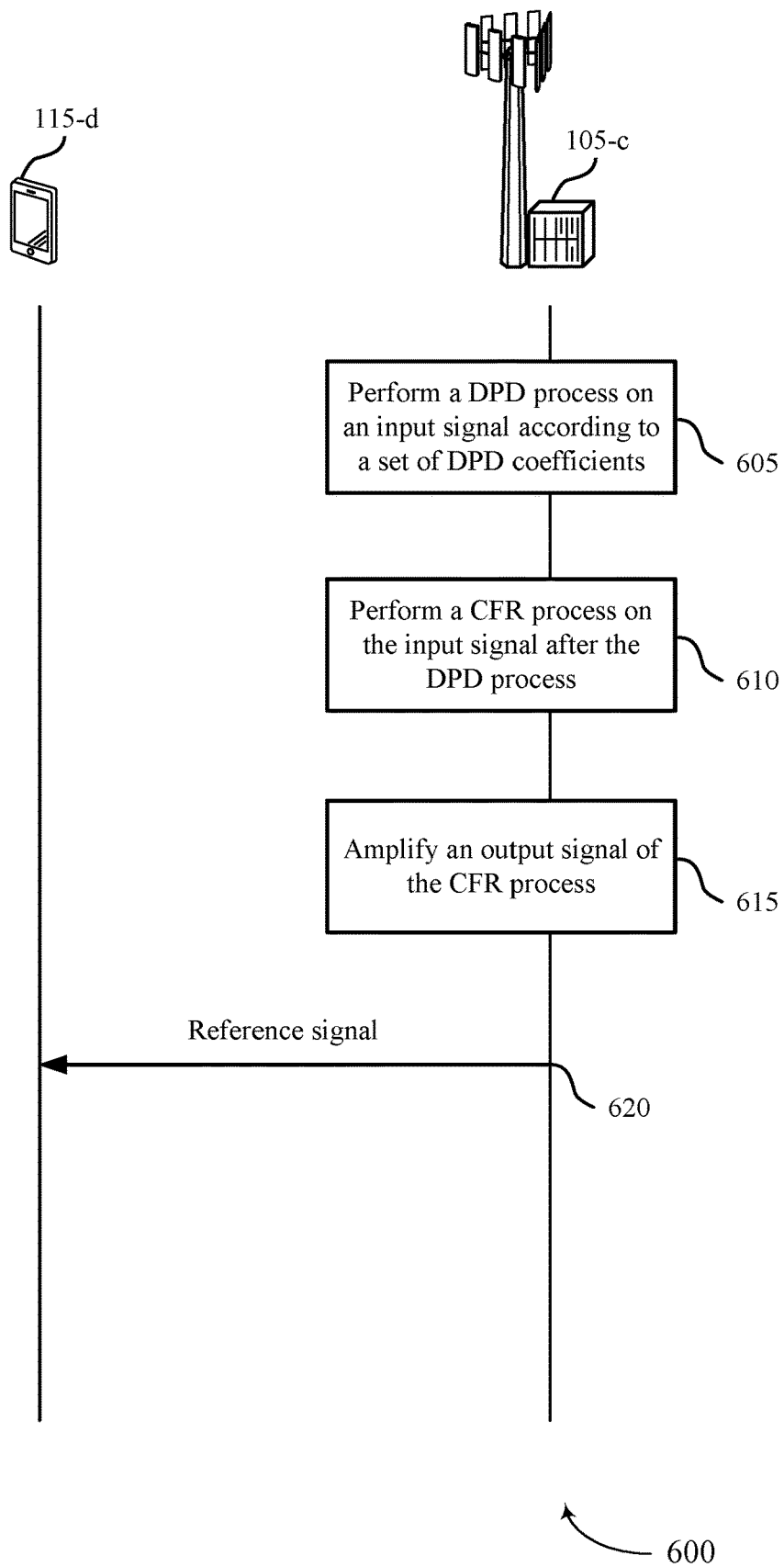
FIG. 6 illustrates an example of a process flow that supports over the air reliable DPD in accordance with one or more aspects of the present disclosure.

FIG. 6 illustrates an example of a process flow 600 that supports over the air reliable DPD in accordance with one or more aspects of the present disclosure. The process flow 600 may include a UE 115-d, which may be an example of a UE 115 as described herein. The process flow 600 may include a network entity 105-c, which may be an example of a network entity 105 as described herein. In the following description of the process flow 600, the operations between the network entity 105-c and the UE 115-d may be transmitted in a different order than the example order shown, or the operations performed by the network entity 105-c and the UE 115-d may be performed in different orders or at different times. Some operations may also be omitted from the process flow 600, and other operations may be added to the process flow 600.

The network entity 105-c may perform a signal processing procedure on an input signal to generate an output signal.

For example, performing the signal processing on the input signal may include performing, at 605, a DPD process on the input signal according to a set of DPD coefficients to compensate for a distortion of a power amplifier. As described with reference to FIG. 5, in some cases, the DPD coefficients may be identified based on performing a training process with a UE (which may be the UE 115-d) for the DPD process.

Performing the signal processing on the input signal may include performing, at 610, a CFR process on the input signal subsequent to performing the DPD process. In some cases, performing the signal processing on the input signal may include clipping, via applying the CFR process, the output signal to a configured peak power level. In some cases, applying the CFR process is based on the set of CFR parameters including one or more clipping parameters (e.g., a polar clipping parameter, a cartesian clipping parameter, a maximal peak power, an input RMS to a power amplifier, or a target PAPR).

In some cases, Performing the signal processing on the input signal may include performing a second CFR process on the input signal prior to the DPD process. The second CFR process may be configured to match a CCDF of the input signal and the output signal.

At 615, the network entity 105-c may amplify the output signal via the power amplifier to generate an amplified signal.

At 620, the network entity 105-c may transmit, to the UE 115-d, the amplified signal via one or more antennas.

Figure 7:
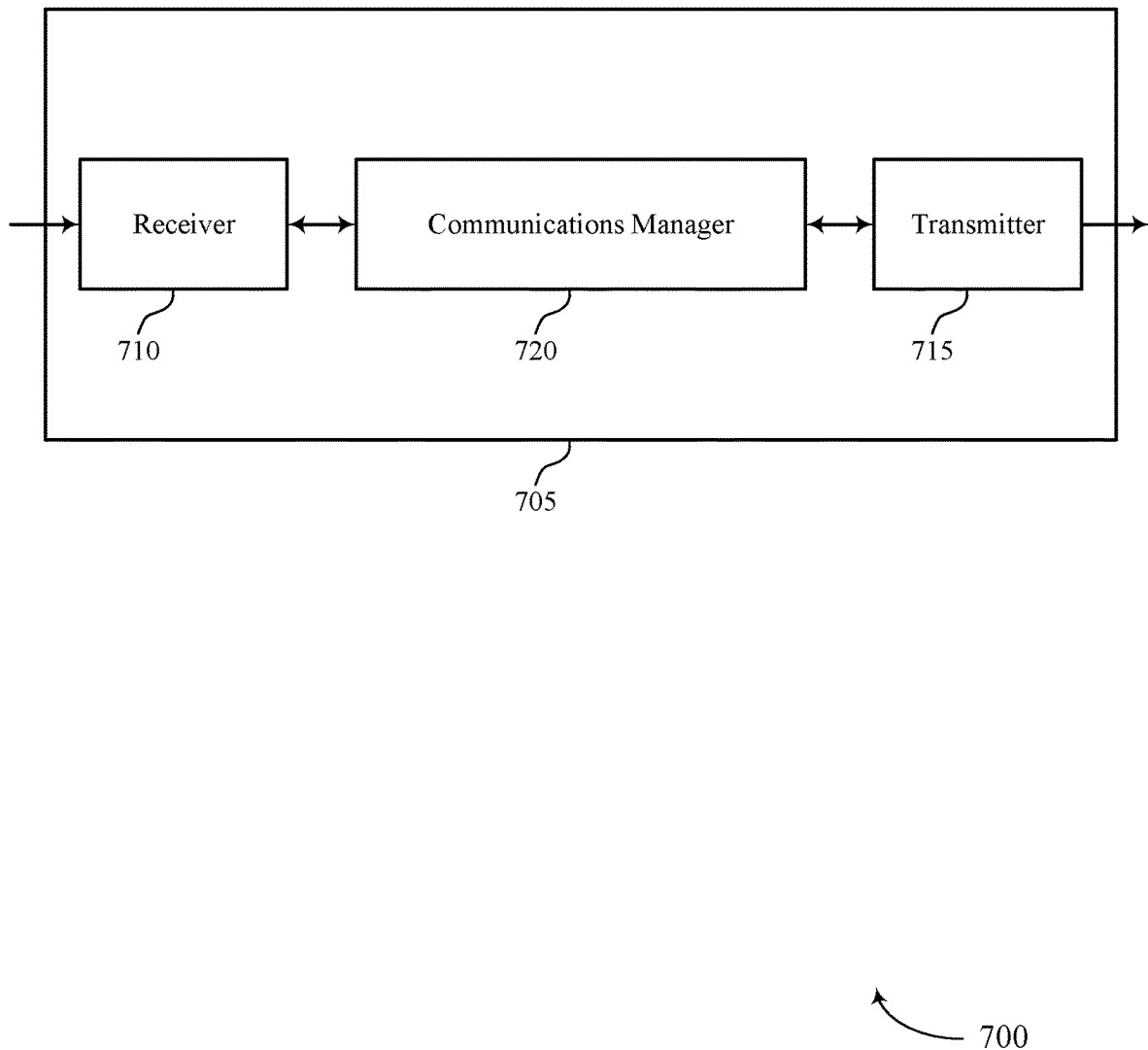
FIGS. 7 and 8 show block diagrams of devices that support over the air reliable DPD in accordance with one or more aspects of the present disclosure.

FIG. 7 shows a block diagram 700 of a device 705 that supports over the air reliable DPD in accordance with one or more aspects of the present disclosure. The device 705 may be an example of aspects of a network entity 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 705. In some examples, the receiver 710 may support obtaining information by receiving signals via one or more antennas. Additionally, or alternatively, the receiver 710 may support obtaining information by receiving signals via one or more wired (e.g., electrical, fiber optic) interfaces, wireless interfaces, or any combination thereof.

The transmitter 715 may provide a means for outputting (e.g., transmitting, providing, conveying, sending) information generated by other components of the device 705. For example, the transmitter 715 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 715 may support outputting information by transmitting signals via one or more antennas. Additionally, or alternatively, the transmitter 715 may support outputting information by transmitting signals via one or more wired (e.g., electrical, fiber optic) interfaces, wireless interfaces, or any combination thereof. In some examples, the transmitter 715 and the receiver 710 may be co-located in a transceiver, which may include or be coupled with a modem.

The communications manager 720, the receiver 710, the transmitter 715, or various combinations thereof or various components thereof may be examples of means for performing various aspects of over the air reliable DPD as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a DSP, a CPU, an ASIC, a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a network entity in accordance with examples as disclosed herein. For example, the communications manager 720 may be configured as or otherwise support a means for performing a signal processing procedure on an input signal to generate an output signal. To perform the signal processing, the communications manager 720 may be configured as or otherwise support a means for performing a DPD process on the input signal according to a set of DPD coefficients to compensate for a distortion of a power amplifier. To perform the signal processing, the communications manager 720 may be configured as or otherwise support a means for performing a CFR process on the input signal subsequent to performing the DPD process. The communications manager 720 may be configured as or otherwise support a means for amplifying the output signal via the power amplifier to generate an amplified signal. The communications manager 720 may be configured as or otherwise support a means for transmitting, to a UE, the amplified signal via one or more antennas.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for more efficient utilization of communication resources.

Figure 8:
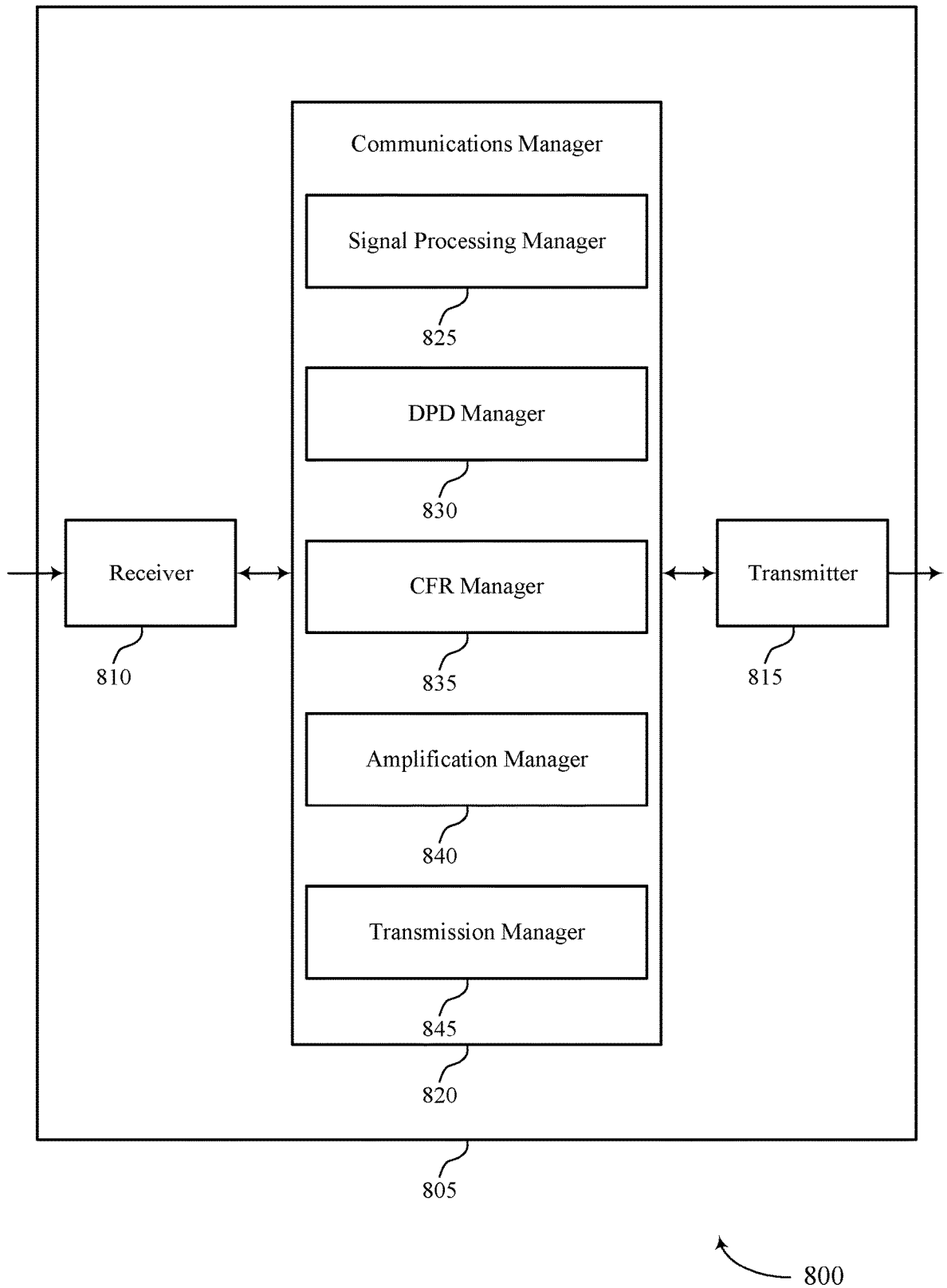

FIG. 8 shows a block diagram 800 of a device 805 that supports over the air reliable DPD in accordance with one or more aspects of the present disclosure. The device 805 may be an example of aspects of a device 705 or a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The device 805, or various components thereof, may be an example of means for performing various aspects of over the air reliable DPD as described herein. For example, the communications manager 820 may include a signal processing manager 825, a DPD manager 830, an CFR manager 835, an amplification manager 840, a transmission manager 845, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a network entity in accordance with examples as disclosed herein. The signal processing manager 825 may be configured as or otherwise support a means for performing a signal processing procedure on an input signal to generate an output signal, performing the signal processing procedure. To perform the signal processing, the DPD manager 830 may be configured as or otherwise support a means for performing a DPD process on the input signal according to a set of DPD coefficients to compensate for a distortion of a power amplifier. To perform the signal processing, the CFR manager 835 may be configured as or otherwise support a means for performing a CFR process on the input signal subsequent to performing the DPD process. The amplification manager 840 may be configured as or otherwise support a means for amplifying the output signal via the power amplifier to generate an amplified signal. The transmission manager 845 may be configured as or otherwise support a means for transmitting, to a UE, the amplified signal via one or more antennas.

Figure 9:
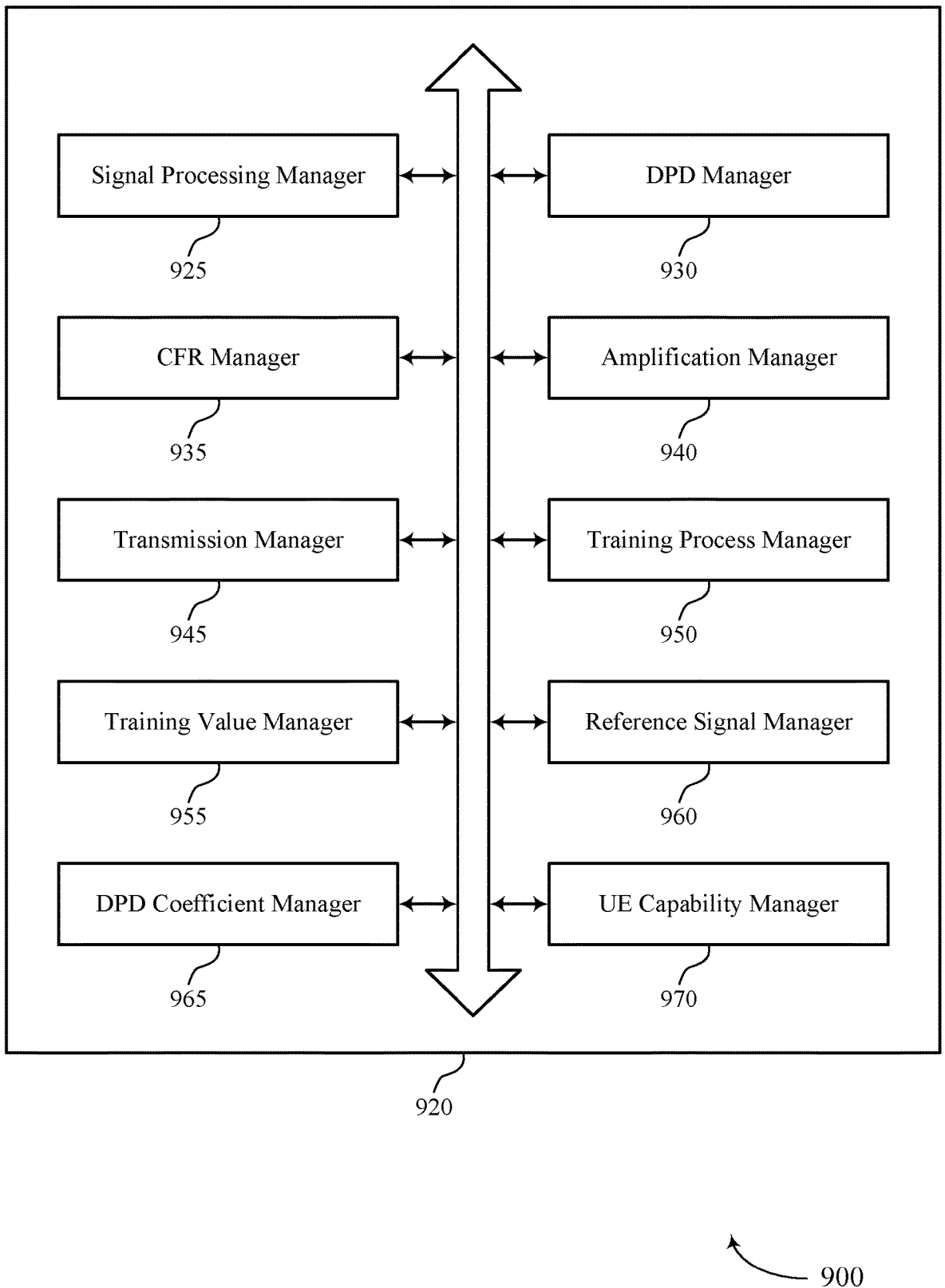
FIG. 9 shows a block diagram of a communications manager that supports over the air reliable DPD in accordance with one or more aspects of the present disclosure.

FIG. 9 shows a block diagram 900 of a communications manager 920 that supports over the air reliable DPD in accordance with one or more aspects of the present disclosure. The communications manager 920 may be an example of aspects of a communications manager 720, a communications manager 820, or both, as described herein. The communications manager 920, or various components thereof, may be an example of means for performing various aspects of over the air reliable DPD as described herein. For example, the communications manager 920 may include a signal processing manager 925, a DPD manager 930, an CFR manager 935, an amplification manager 940, a transmission manager 945, a training process manager 950, a training value manager 955, a reference signal manager 960, a DPD coefficient manager 965, a UE capability manager 970, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 920 may support wireless communications at a network entity in accordance with examples as disclosed herein. The signal processing manager 925 may be configured as or otherwise support a means for performing a signal processing procedure on an input signal to generate an output signal, performing the signal processing procedure. To perform the signal processing, the DPD manager 930 may be configured as or otherwise support a means for performing a DPD process on the input signal according to a set of DPD coefficients to compensate for a distortion of a power amplifier. To perform the signal processing, the CFR manager 935 may be configured as or otherwise support a means for performing a CFR process on the input signal subsequent to performing the DPD process. The amplification manager 940 may be configured as or otherwise support a means for amplifying the output signal via the power amplifier to generate an amplified signal. The transmission manager 945 may be configured as or otherwise support a means for transmitting, to a UE, the amplified signal via one or more antennas.

In some examples, the training process manager 950 may be configured as or otherwise support a means for identifying the set of DPD coefficients based on performing a training process for the DPD process.

In some examples, to support performing the training process, the training value manager 955 may be configured as or otherwise support a means for transmitting, to the UE, control information indicative of a set of training values including a set of CFR parameters associated with performing the CFR process. In some examples, to support performing the training process, the reference signal manager 960 may be configured as or otherwise support a means for transmitting, to the UE, a reference signal. In some examples, to support performing the training process, the DPD coefficient manager 965 may be configured as or otherwise support a means for receiving, from the UE, the set of DPD coefficients identified at the UE based on the set of training values and the reference signal.

In some examples, the UE capability manager 970 may be configured as or otherwise support a means for receiving, from the UE, control information indicative of a capability of the UE to identify sets of DPD coefficients accounting for the CFR process subsequent to the DPD process, where performing the training process is based on the control information.

In some examples, the reference signal manager 960 may be configured as or otherwise support a means for transmitting, to the UE, an indication of a configured training signal, where the reference signal includes the configured training signal.

In some examples, the set of CFR parameters includes at least one of a polar clipping parameter, a cartesian clipping parameter, a maximal peak power, an input root mean square to the power amplifier, or a target peak to average power ratio.

In some examples, to support performing the signal processing procedure, the CFR manager 935 may be configured as or otherwise support a means for clipping, via applying the CFR process, the output signal to a configured peak power level.

In some examples, applying the CFR process is based on the set of CFR parameters including one or more clipping parameters.

In some examples, to support performing the signal processing procedure, the CFR manager 935 may be configured as or otherwise support a means for performing a second CFR process prior to the DPD process.

In some examples, the second CFR process is configured match a CCDF of the input signal and the output signal.

Figure 10:
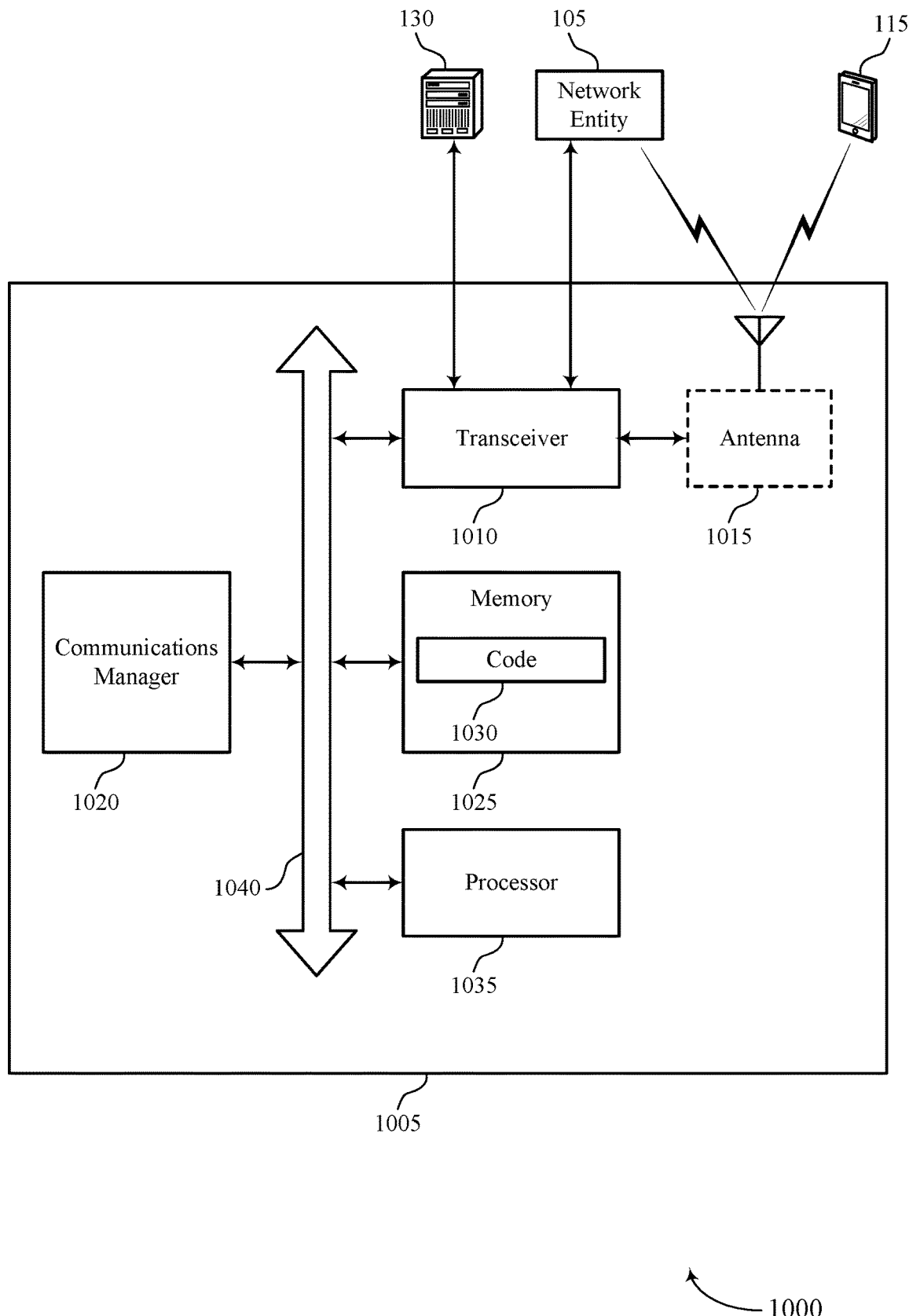
FIG. 10 shows a diagram of a system including a device that supports over the air reliable DPD in accordance with one or more aspects of the present disclosure.

FIG. 10 shows a diagram of a system 1000 including a device 1005 that supports over the air reliable DPD in accordance with one or more aspects of the present disclosure. The device 1005 may be an example of or include the components of a device 705, a device 805, or a network entity 105 as described herein. The device 1005 may communicate with one or more network entities 105, one or more UEs 115, or any combination thereof, which may include communications over one or more wired interfaces, over one or more wireless interfaces, or any combination thereof. The device 1005 may include components that support outputting and obtaining communications, such as a communications manager 1020, a transceiver 1010, an antenna 1015, a memory 1025, code 1030, and a processor 1035. These components may be in electronic communication or otherwise coupled (e.g., operatively, communicatively, functionally, electronically, electrically) via one or more buses (e.g., a bus 1040).

The transceiver 1010 may support bi-directional communications via wired links, wireless links, or both as described herein. In some examples, the transceiver 1010 may include a wired transceiver and may communicate bi-directionally with another wired transceiver. Additionally, or alternatively, in some examples, the transceiver 1010 may include a wireless transceiver and may communicate bi-directionally with another wireless transceiver. In some examples, the device 1005 may include one or more antennas 1015, which may be capable of transmitting or receiving wireless transmissions (e.g., concurrently). The transceiver 1010 may also include a modem to modulate signals, to provide the modulated signals for transmission (e.g., by one or more antennas 1015, by a wired transmitter), to receive modulated signals (e.g., from one or more antennas 1015, from a wired receiver), and to demodulate signals. The transceiver 1010, or the transceiver 1010 and one or more antennas 1015 or wired interfaces, where applicable, may be an example of a transmitter 715, a transmitter 815, a receiver 710, a receiver 810, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1025 may include random access memory (RAM) and read-only memory (ROM). The memory 1025 may store computer-readable, computer-executable code 1030 including instructions that, when executed by the processor 1035, cause the device 1005 to perform various functions described herein. The code 1030 may be stored in a non-transitory computer-readable medium such as system memory or another type of memory. In some cases, the code 1030 may not be directly executable by the processor 1035 but may cause a computer (e.g., when compiled and executed) to perform functions described herein. In some cases, the memory 1025 may contain, among other things, a basic I/O system (BIOS) which may control basic hardware or software operation such as the interaction with peripheral components or devices.

The processor 1035 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1035 may be configured to operate a memory array using a memory controller. In some other cases, a memory controller may be integrated into the processor 1035. The processor 1035 may be configured to execute computer-readable instructions stored in a memory (e.g., the memory 1025) to cause the device 1005 to perform various functions (e.g., functions or tasks supporting over the air reliable DPD). For example, the device 1005 or a component of the device 1005 may include a processor 1035 and memory 1025 coupled with the processor 1035, the processor 1035 and memory 1025 configured to perform various functions described herein. The processor 1035 may be an example of a cloud-computing platform (e.g., one or more physical nodes and supporting software such as operating systems, virtual machines, or container instances) that may host the functions (e.g., by executing code 1030) to perform the functions of the device 1005.

In some examples, a bus 1040 may support communications of (e.g., within) a protocol layer of a protocol stack. In some examples, a bus 1040 may support communications associated with a logical channel of a protocol stack (e.g., between protocol layers of a protocol stack), which may include communications performed within a component of the device 1005, or between different components of the device 1005 that may be co-located or located in different locations (e.g., where the device 1005 may refer to a system in which one or more of the communications manager 1020, the transceiver 1010, the memory 1025, the code 1030, and the processor 1035 may be located in one of the different components or divided between different components).

In some examples, the communications manager 1020 may manage aspects of communications with a core network 130 (e.g., via one or more wired or wireless backhaul links). For example, the communications manager 1020 may manage the transfer of data communications for client devices, such as one or more UEs 115. In some examples, the communications manager 1020 may manage communications with other network entities 105, and may include a controller or scheduler for controlling communications with UEs 115 in cooperation with other network entities 105. In some examples, the communications manager 1020 may support an X2 interface within an LTE/LTE-A wireless communications network technology to provide communication between network entities 105.

The communications manager 1020 may support wireless communications at a network entity in accordance with examples as disclosed herein. For example, the communications manager 1020 may be configured as or otherwise support a means for performing a signal processing procedure on an input signal to generate an output signal, performing the signal processing procedure. To perform the signal processing, the communications manager 1020 may be configured as or otherwise support a means for performing a DPD process on the input signal according to a set of DPD coefficients to compensate for a distortion of a power amplifier. To perform the signal processing, the communications manager 1020 may be configured as or otherwise support a means for performing a CFR process on the input signal subsequent to performing the DPD process. The communications manager 1020 may be configured as or otherwise support a means for amplifying the output signal via the power amplifier to generate an amplified signal. The communications manager 1020 may be configured as or otherwise support a means for transmitting, to a UE, the amplified signal via one or more antennas.

By including or configuring the communications manager 1020 in accordance with examples as described herein, the device 1005 may support techniques for improved communication reliability, more efficient utilization of communication resources, and improved coordination between devices.

In some examples, the communications manager 1020 may be configured to perform various operations (e.g., receiving, obtaining, monitoring, outputting, transmitting) using or otherwise in cooperation with the transceiver 1010, the one or more antennas 1015 (e.g., where applicable), or any combination thereof. Although the communications manager 1020 is illustrated as a separate component, in some examples, one or more functions described with reference to the communications manager 1020 may be supported by or performed by the processor 1035, the memory 1025, the code 1030, the transceiver 1010, or any combination thereof. For example, the code 1030 may include instructions executable by the processor 1035 to cause the device 1005 to perform various aspects of over the air reliable DPD as described herein, or the processor 1035 and the memory 1025 may be otherwise configured to perform or support such operations.

Figure 11:
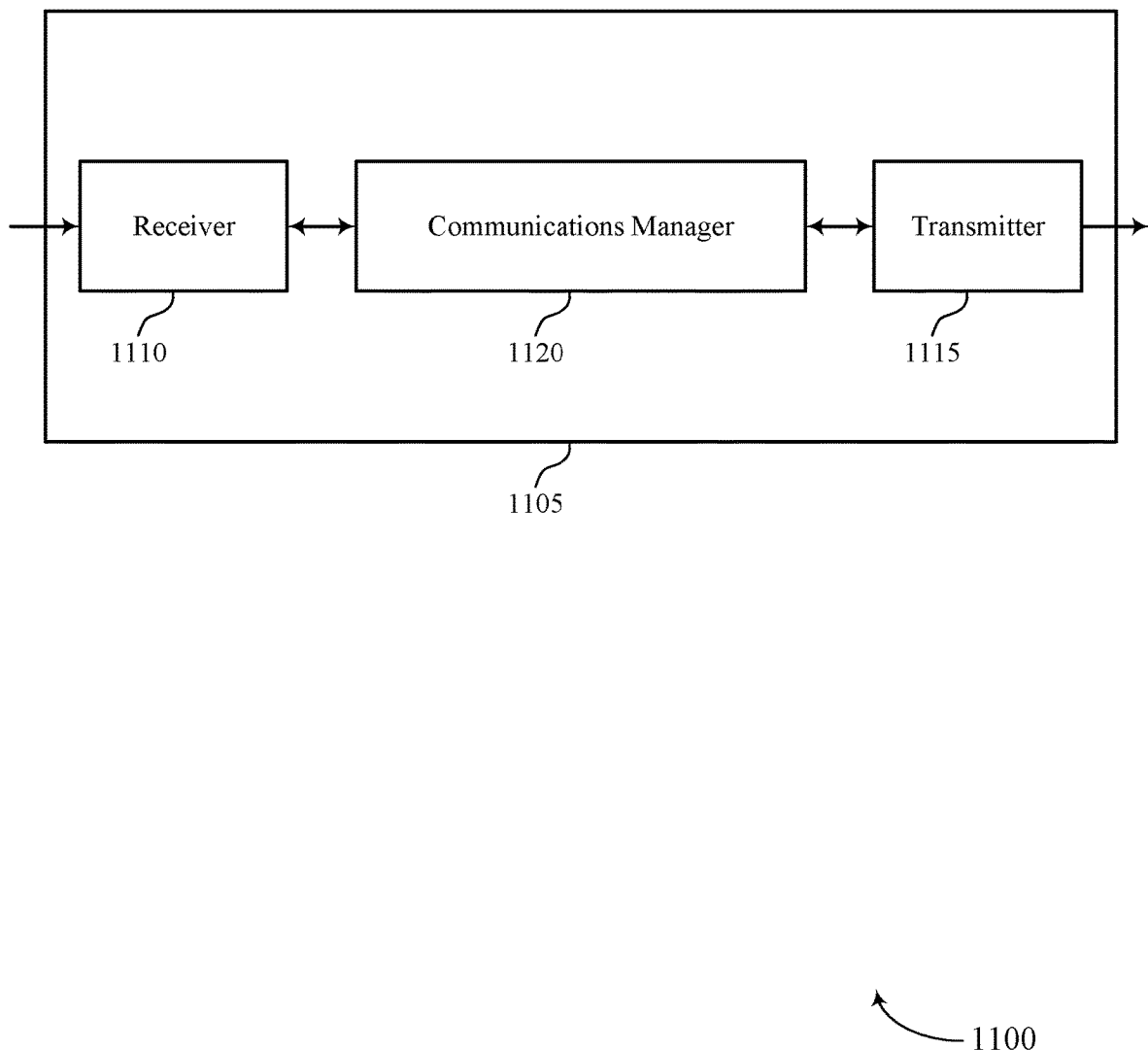
FIGS. 11 and 12 show block diagrams of devices that support over the air reliable DPD in accordance with one or more aspects of the present disclosure.

FIG. 11 shows a block diagram 1100 of a device 1105 that supports over the air reliable DPD in accordance with one or more aspects of the present disclosure. The device 1105 may be an example of aspects of a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to over the air reliable DPD). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to over the air reliable DPD). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of over the air reliable DPD as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), a central processing unit (CPU), an application-specific integrated circuit (ASIC), an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a UE in accordance with examples as disclosed herein. For example, the communications manager 1120 may be configured as or otherwise support a means for receiving, from a network entity, control information indicative of a set of training values for a DPD process associated with the network entity, the set of training values including a set of CFR parameters for a CFR process associated with the network entity. The communications manager 1120 may be configured as or otherwise support a means for receiving, from the network entity, a reference signal. The communications manager 1120 may be configured as or otherwise support a means for determining a set of DPD coefficients associated with the DPD process based on the set of training values and the reference signal. The communications manager 1120 may be configured as or otherwise support a means for transmitting, to the network entity, an indication of the set of DPD coefficients.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for more efficient utilization of communication resources.

Figure 12:
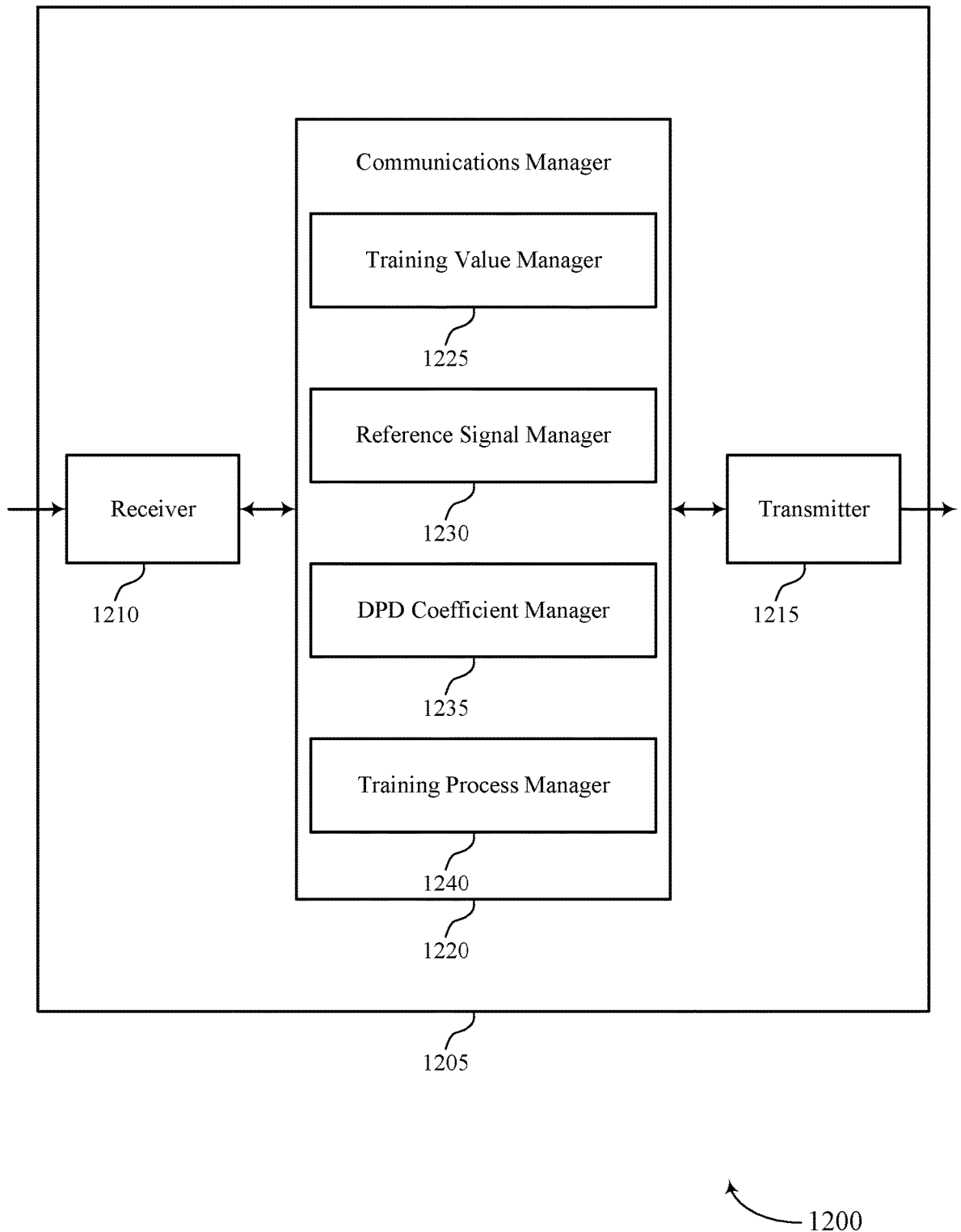

FIG. 12 shows a block diagram 1200 of a device 1205 that supports over the air reliable DPD in accordance with one or more aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to over the air reliable DPD). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to over the air reliable DPD). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of over the air reliable DPD as described herein. For example, the communications manager 1220 may include a training value manager 1225, a reference signal manager 1230, a DPD coefficient manager 1235, a training process manager 1240, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a UE in accordance with examples as disclosed herein. The training value manager 1225 may be configured as or otherwise support a means for receiving, from a network entity, control information indicative of a set of training values for a DPD process associated with the network entity, the set of training values including a set of CFR parameters for a CFR process associated with the network entity. The reference signal manager 1230 may be configured as or otherwise support a means for receiving, from the network entity, a reference signal. The DPD coefficient manager 1235 may be configured as or otherwise support a means for determining a set of DPD coefficients associated with the DPD process based on the set of training values and the reference signal. The training process manager 1240 may be configured as or otherwise support a means for transmitting, to the network entity, an indication of the set of DPD coefficients.

Figure 13:
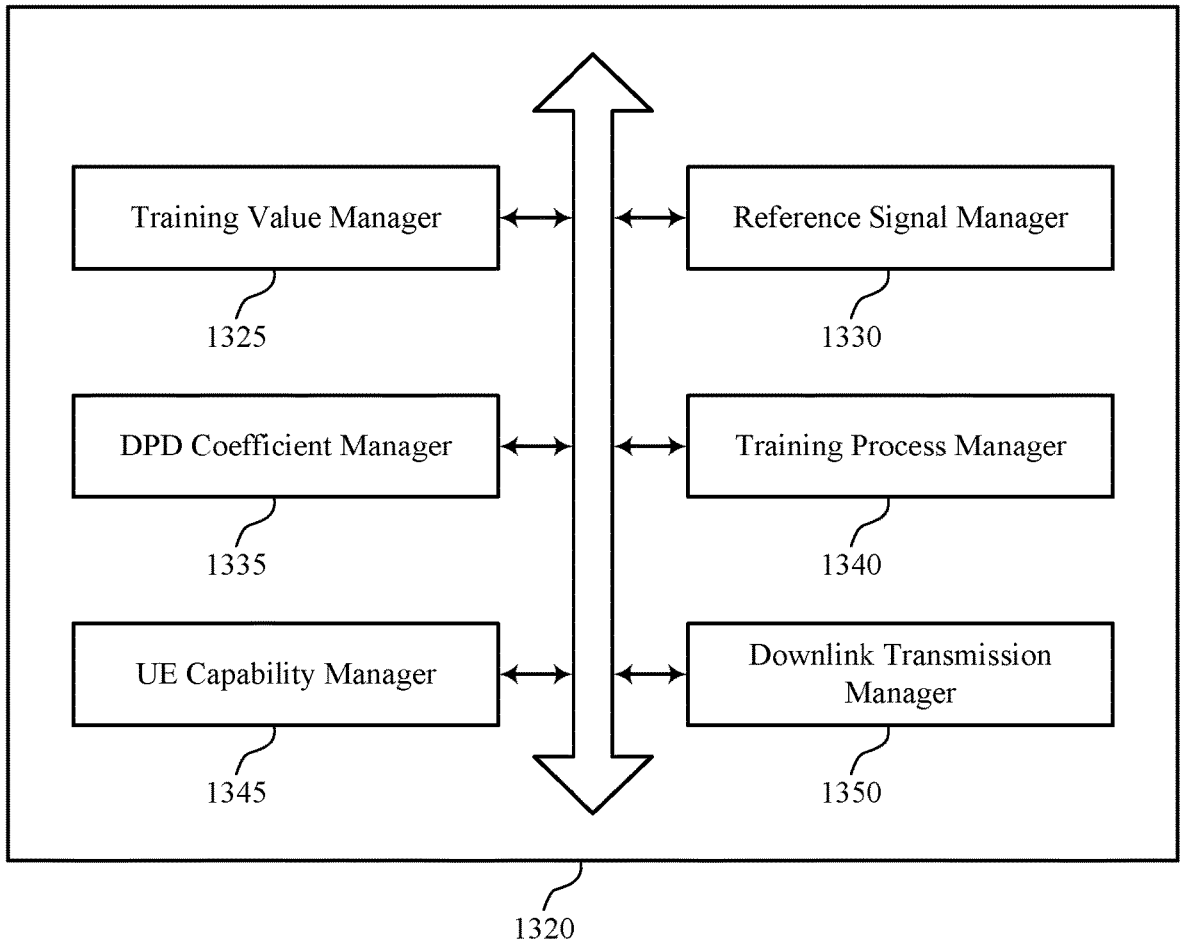
FIG. 13 shows a block diagram of a communications manager that supports over the air reliable DPD in accordance with one or more aspects of the present disclosure.

FIG. 13 shows a block diagram 1300 of a communications manager 1320 that supports over the air reliable DPD in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of over the air reliable DPD as described herein. For example, the communications manager 1320 may include a training value manager 1325, a reference signal manager 1330, a DPD coefficient manager 1335, a training process manager 1340, a UE capability manager 1345, a downlink transmission manager 1350, or any combination thereof. Each of these components may communicate, directly or indirectly, with one another (e.g., via one or more buses).

The communications manager 1320 may support wireless communications at a UE in accordance with examples as disclosed herein. The training value manager 1325 may be configured as or otherwise support a means for receiving, from a network entity, control information indicative of a set of training values for a DPD process associated with the network entity, the set of training values including a set of CFR parameters for a CFR process associated with the network entity. The reference signal manager 1330 may be configured as or otherwise support a means for receiving, from the network entity, a reference signal. The DPD coefficient manager 1335 may be configured as or otherwise support a means for determining a set of DPD coefficients associated with the DPD process based on the set of training values and the reference signal. The training process manager 1340 may be configured as or otherwise support a means for transmitting, to the network entity, an indication of the set of DPD coefficients.

In some examples, the UE capability manager 1345 may be configured as or otherwise support a means for transmitting, to the network entity, control information indicative of a capability of the UE to identify sets of DPD coefficients accounting for the CFR process subsequent to the DPD process.

In some examples, the reference signal manager 1330 may be configured as or otherwise support a means for receiving, from the network entity, an indication of a configured training signal, where the reference signal includes the configured training signal.

In some examples, the set of CFR parameters includes at least one of a polar clipping parameter, a cartesian clipping parameter, a maximal peak power, an input root mean square to a power amplifier, or a target peak to average power ratio.

In some examples, the downlink transmission manager 1350 may be configured as or otherwise support a means for receiving, from the network entity, a downlink transmission based on transmitting the indication of the set of DPD coefficients.

Figure 14:
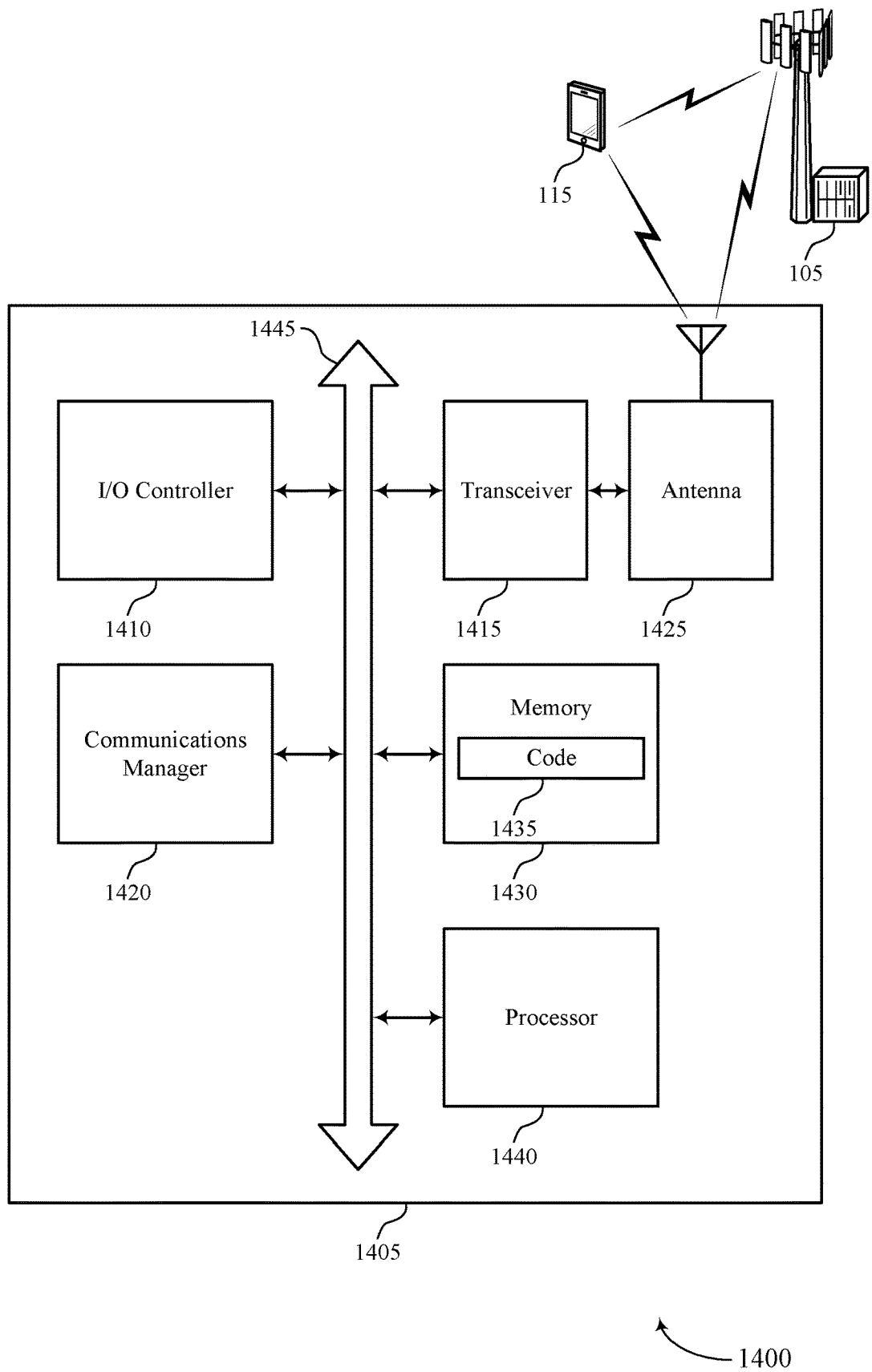
FIG. 14 shows a diagram of a system including a device that supports over the air reliable DPD in accordance with one or more aspects of the present disclosure.

FIG. 14 shows a diagram of a system 1400 including a device 1405 that supports over the air reliable DPD in accordance with one or more aspects of the present disclosure. The device 1405 may be an example of or include the components of a device 1105, a device 1205, or a UE 115 as described herein. The device 1405 may communicate (e.g., wirelessly) with one or more network entities 105, one or more UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally, or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting over the air reliable DPD). For example, the device 1405 or a component of the device 1405 may include a processor 1440 and memory 1430 coupled with or to the processor 1440, the processor 1440 and memory 1430 configured to perform various functions described herein.

The communications manager 1420 may support wireless communications at a UE in accordance with examples as disclosed herein. For example, the communications manager 1420 may be configured as or otherwise support a means for receiving, from a network entity, control information indicative of a set of training values for a DPD process associated with the network entity, the set of training values including a set of CFR parameters for a CFR process associated with the network entity. The communications manager 1420 may be configured as or otherwise support a means for receiving, from the network entity, a reference signal. The communications manager 1420 may be configured as or otherwise support a means for determining a set of DPD coefficients associated with the DPD process based on the set of training values and the reference signal. The communications manager 1420 may be configured as or otherwise support a means for transmitting, to the network entity, an indication of the set of DPD coefficients.

By including or configuring the communications manager 1420 in accordance with examples as described herein, the device 1405 may support techniques improved communication reliability, more efficient utilization of communication resources, and improved coordination between devices.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of over the air reliable DPD as described herein, or the processor 1440 and the memory 1430 may be otherwise configured to perform or support such operations.

Figure 15:
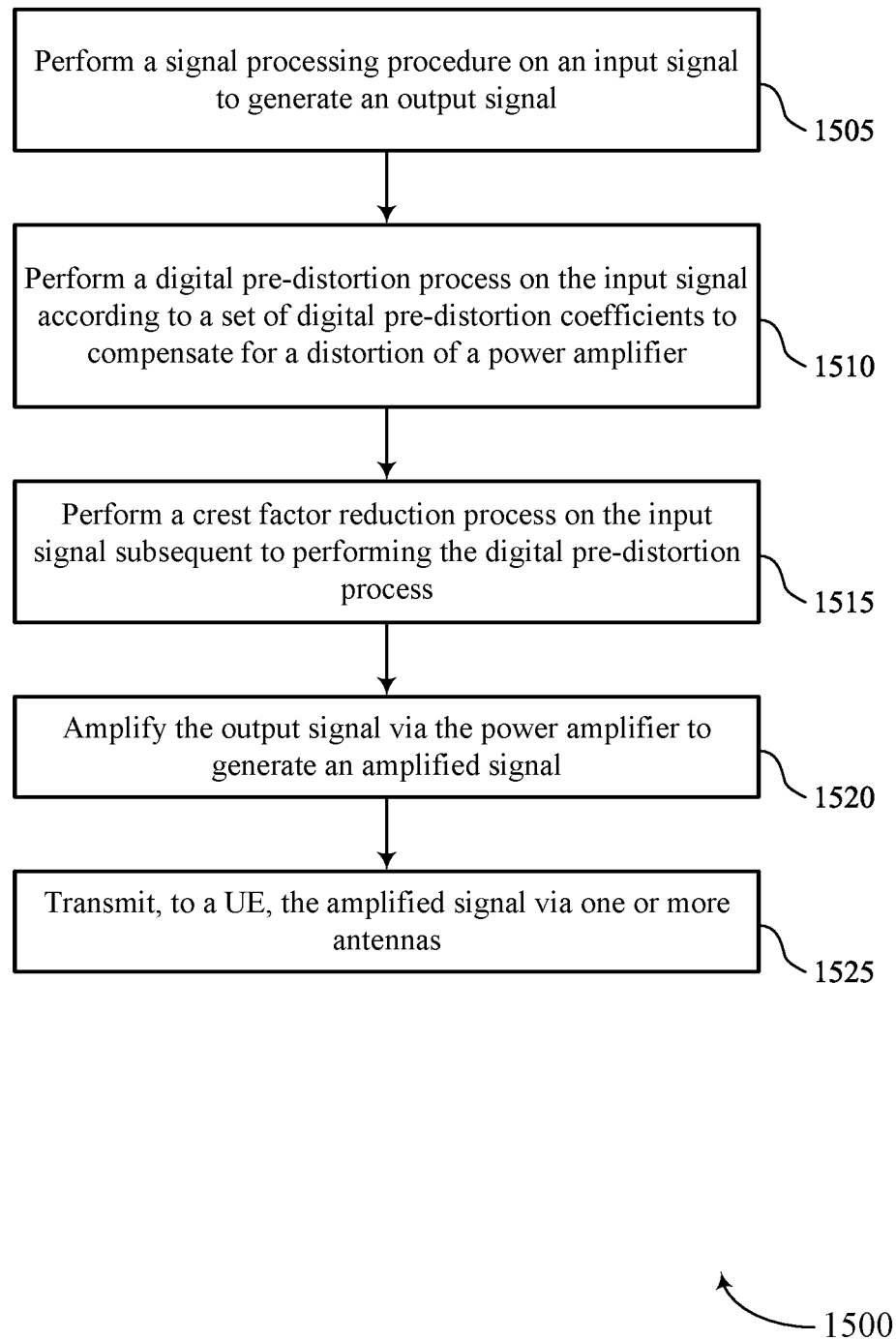
FIGS. 15 through 18 show flowcharts illustrating methods that support over the air reliable DPD in accordance with one or more aspects of the present disclosure.

FIG. 15 shows a flowchart illustrating a method 1500 that supports over the air reliable DPD in accordance with one or more aspects of the present disclosure. The operations of the method 1500 may be implemented by a network entity or its components as described herein. For example, the operations of the method 1500 may be performed by a network entity as described with reference to FIGS. 1 through 10. In some examples, a network entity may execute a set of instructions to control the functional elements of the network entity to perform the described functions. Additionally, or alternatively, the network entity may perform aspects of the described functions using special-purpose hardware.

At 1505, the method may include performing a signal processing procedure on an input signal to generate an output signal. The operations of 1505 may be performed in accordance with examples as disclosed herein. In some examples, aspects of the operations of 1505 may be performed by a signal processing manager 925 as described with reference to FIG. 9.

At 1510, performing the signal processing procedure may include performing a DPD process on the input signal according to a set of DPD coefficients to compensate for a distortion of a power amplifier. The operations of 1510 may be performed in accordance with examples as disclosed herein. In some examples, aspects of the operations of 1510 may be performed by a DPD manager 930 as described with reference to FIG. 9.

At 1515, performing the signal processing procedure may include performing a CFR process on the input signal subsequent to performing the DPD process. The operations of 1515 may be performed in accordance with examples as disclosed herein. In some examples, aspects of the operations of 1515 may be performed by an CFR manager 935 as described with reference to FIG. 9.

At 1520, the method may include amplifying the output signal via the power amplifier to generate an amplified signal. The operations of 1520 may be performed in accordance with examples as disclosed herein. In some examples, aspects of the operations of 1520 may be performed by an amplification manager 940 as described with reference to FIG. 9.

At 1525, the method may include transmitting, to a UE, the amplified signal via one or more antennas. The operations of 1525 may be performed in accordance with examples as disclosed herein. In some examples, aspects of the operations of 1525 may be performed by a transmission manager 945 as described with reference to FIG. 9.

Figure 16:
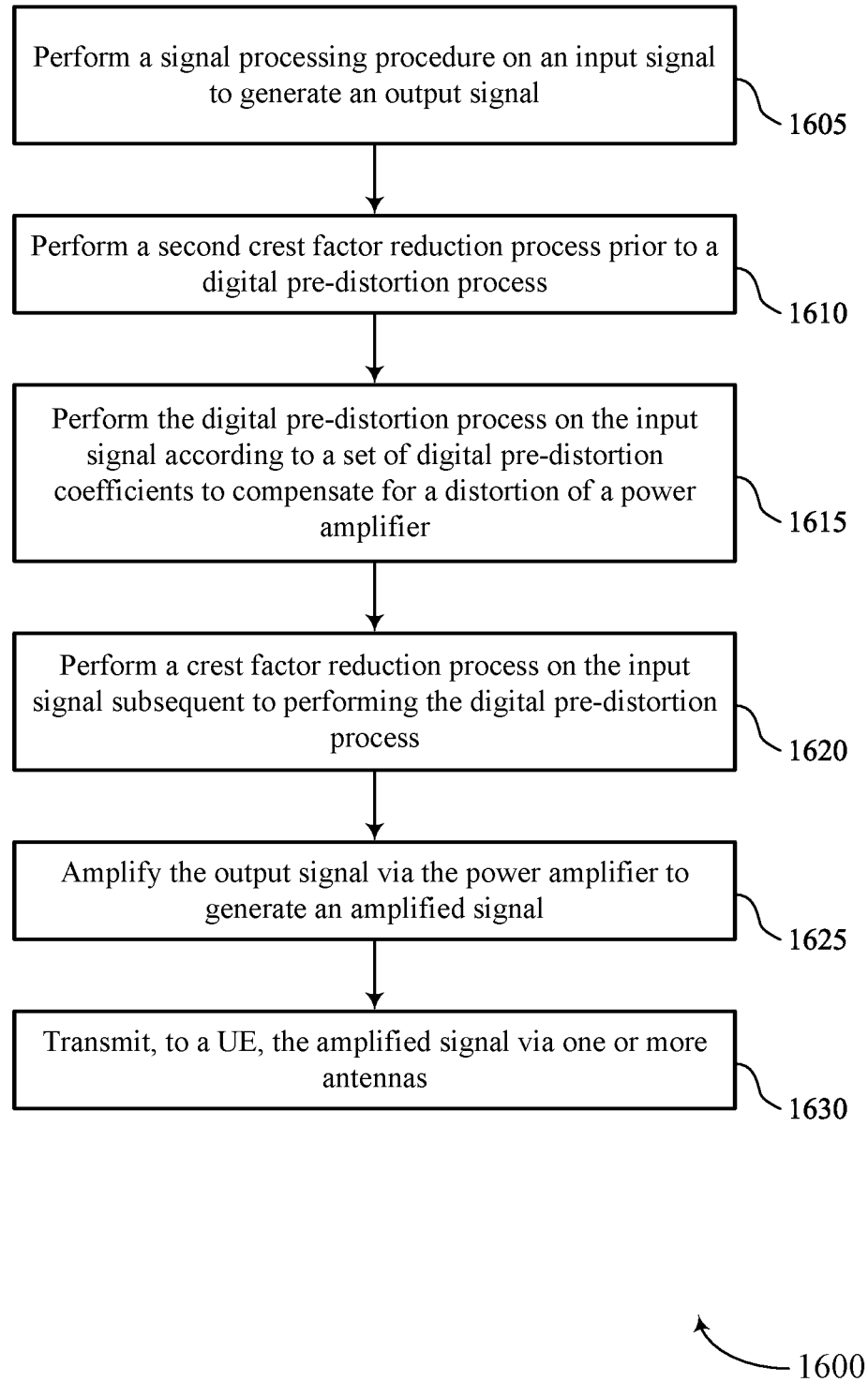

FIG. 16 shows a flowchart illustrating a method 1600 that supports over the air reliable DPD in accordance with one or more aspects of the present disclosure. The operations of the method 1600 may be implemented by a network entity or its components as described herein. For example, the operations of the method 1600 may be performed by a network entity as described with reference to FIGS. 1 through 10. In some examples, a network entity may execute a set of instructions to control the functional elements of the network entity to perform the described functions. Additionally, or alternatively, the network entity may perform aspects of the described functions using special-purpose hardware.

At 1605, the method may include performing a signal processing procedure on an input signal to generate an output signal. The operations of 1605 may be performed in accordance with examples as disclosed herein. In some examples, aspects of the operations of 1605 may be performed by a signal processing manager 925 as described with reference to FIG. 9.

At 1610, performing the signal processing procedure may include performing a second CFR process prior to a DPD process. The operations of 1610 may be performed in accordance with examples as disclosed herein. In some examples, aspects of the operations of 1610 may be performed by an CFR manager 935 as described with reference to FIG. 9.

At 1615, performing the signal processing procedure may include performing the DPD process on the input signal according to a set of DPD coefficients to compensate for a distortion of a power amplifier. The operations of 1615 may be performed in accordance with examples as disclosed herein. In some examples, aspects of the operations of 1615 may be performed by a DPD manager 930 as described with reference to FIG. 9.

At 1620, the method may include performing a CFR process on the input signal subsequent to performing the DPD process. The operations of 1620 may be performed in accordance with examples as disclosed herein. In some examples, aspects of the operations of 1620 may be performed by an CFR manager 935 as described with reference to FIG. 9.

At 1625, the method may include amplifying the output signal via the power amplifier to generate an amplified signal. The operations of 1625 may be performed in accordance with examples as disclosed herein. In some examples, aspects of the operations of 1625 may be performed by an amplification manager 940 as described with reference to FIG. 9.

At 1630, the method may include transmitting, to a UE, the amplified signal via one or more antennas. The operations of 1630 may be performed in accordance with examples as disclosed herein. In some examples, aspects of the operations of 1630 may be performed by a transmission manager 945 as described with reference to FIG. 9.

Figure 17:
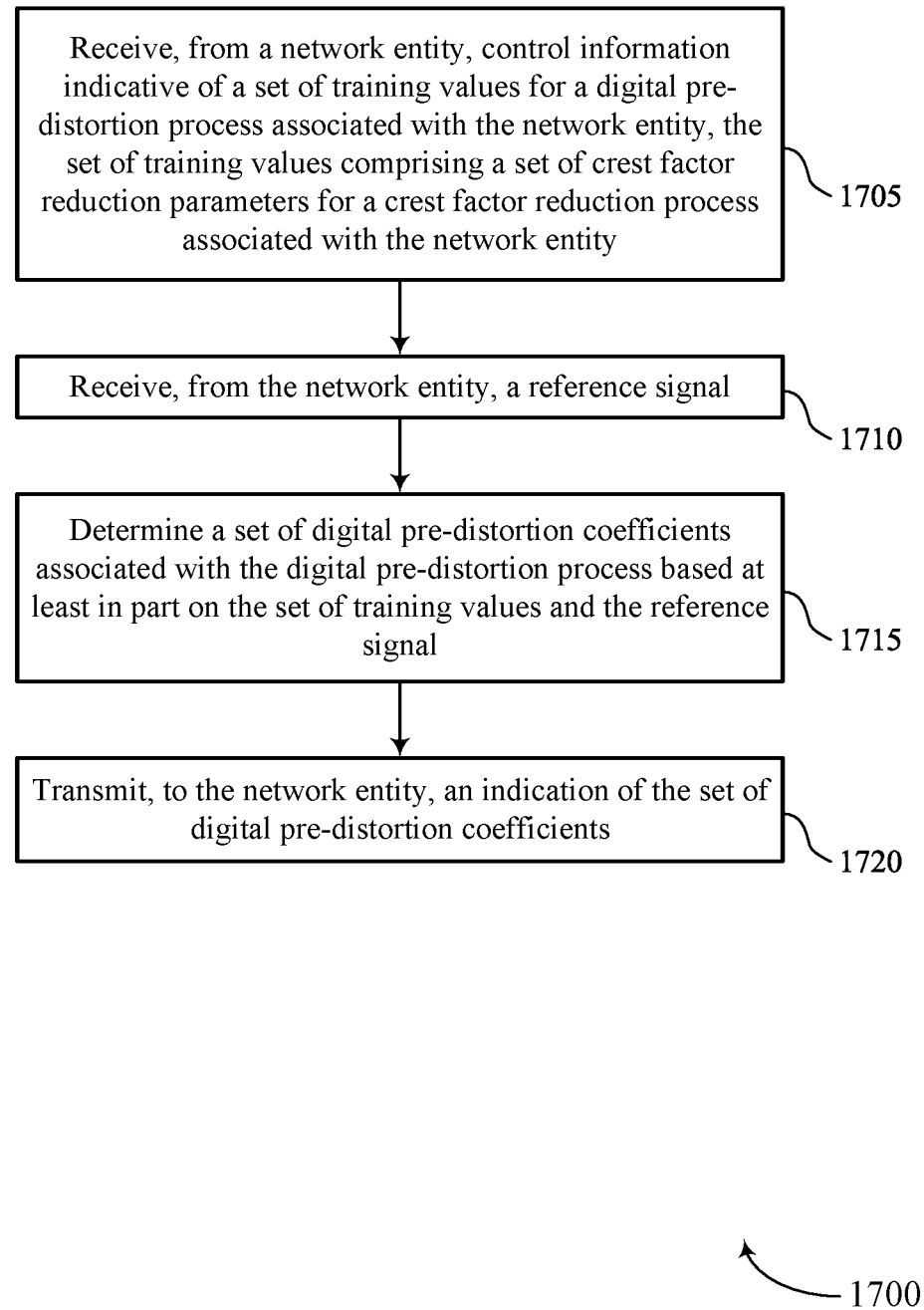

FIG. 17 shows a flowchart illustrating a method 1700 that supports over the air reliable DPD in accordance with one or more aspects of the present disclosure. The operations of the method 1700 may be implemented by a UE or its components as described herein. For example, the operations of the method 1700 may be performed by a UE 115 as described with reference to FIGS. 1 through 6 and 11 through 14. In some examples, a UE may execute a set of instructions to control the functional elements of the UE to perform the described functions. Additionally, or alternatively, the UE may perform aspects of the described functions using special-purpose hardware.

At 1705, the method may include receiving, from a network entity, control information indicative of a set of training values for a DPD process associated with the network entity, the set of training values including a set of CFR parameters for a CFR process associated with the network entity. The operations of 1705 may be performed in accordance with examples as disclosed herein. In some examples, aspects of the operations of 1705 may be performed by a training value manager 1325 as described with reference to FIG. 13.

At 1710, the method may include receiving, from the network entity, a reference signal. The operations of 1710 may be performed in accordance with examples as disclosed herein. In some examples, aspects of the operations of 1710 may be performed by a reference signal manager 1330 as described with reference to FIG. 13.

At 1715, the method may include determining a set of DPD coefficients associated with the DPD process based on the set of training values and the reference signal. The operations of 1715 may be performed in accordance with examples as disclosed herein. In some examples, aspects of the operations of 1715 may be performed by a DPD coefficient manager 1335 as described with reference to FIG. 13.

At 1720, the method may include transmitting, to the network entity, an indication of the set of DPD coefficients. The operations of 1720 may be performed in accordance with examples as disclosed herein. In some examples, aspects of the operations of 1720 may be performed by a training process manager 1340 as described with reference to FIG. 13.

Figure 18:
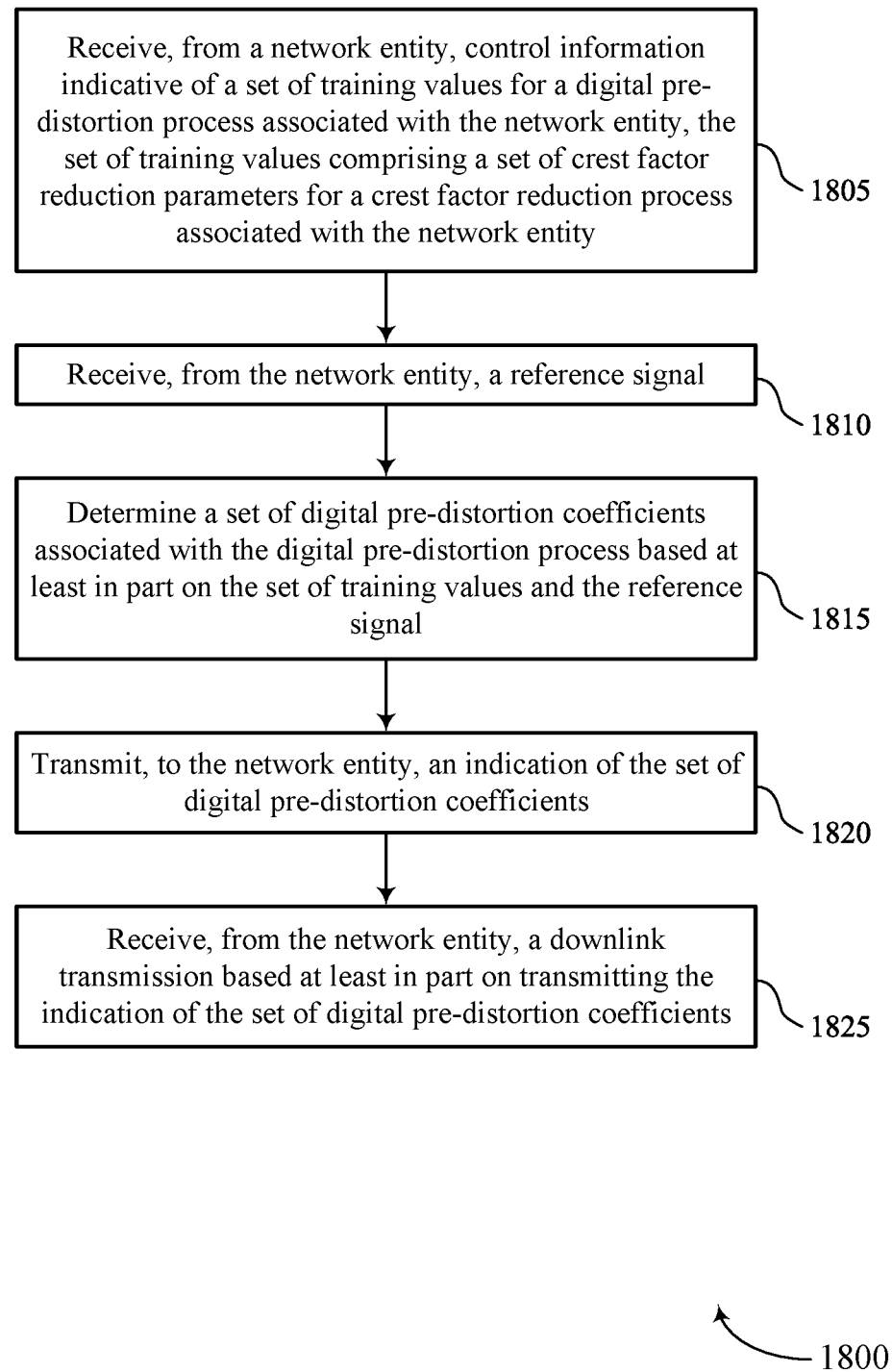

FIG. 18 shows a flowchart illustrating a method 1800 that supports over the air reliable DPD in accordance with one or more aspects of the present disclosure. The operations of the method 1800 may be implemented by a UE or its components as described herein. For example, the operations of the method 1800 may be performed by a UE 115 as described with reference to FIGS. 1 through 6 and 11 through 14. In some examples, a UE may execute a set of instructions to control the functional elements of the UE to perform the described functions. Additionally, or alternatively, the UE may perform aspects of the described functions using special-purpose hardware.

At 1805, the method may include receiving, from a network entity, control information indicative of a set of training values for a DPD process associated with the network entity, the set of training values including a set of CFR parameters for a CFR process associated with the network entity. The operations of 1805 may be performed in accordance with examples as disclosed herein. In some examples, aspects of the operations of 1805 may be performed by a training value manager 1325 as described with reference to FIG. 13.

At 1810, the method may include receiving, from the network entity, a reference signal. The operations of 1810 may be performed in accordance with examples as disclosed herein. In some examples, aspects of the operations of 1810 may be performed by a reference signal manager 1330 as described with reference to FIG. 13.

At 1815, the method may include determining a set of DPD coefficients associated with the DPD process based on the set of training values and the reference signal. The operations of 1815 may be performed in accordance with examples as disclosed herein. In some examples, aspects of the operations of 1815 may be performed by a DPD coefficient manager 1335 as described with reference to FIG. 13.

At 1820, the method may include transmitting, to the network entity, an indication of the set of DPD coefficients. The operations of 1820 may be performed in accordance with examples as disclosed herein. In some examples, aspects of the operations of 1820 may be performed by a training process manager 1340 as described with reference to FIG. 13.

At 1825, the method may include receiving, from the network entity, a downlink transmission based on transmitting the indication of the set of DPD coefficients. The operations of 1825 may be performed in accordance with examples as disclosed herein. In some examples, aspects of the operations of 1825 may be performed by a downlink transmission manager 1350 as described with reference to FIG. 13.

The following provides an overview of aspects of the present disclosure:

Aspect 1: A method for wireless communications at a network entity, comprising: performing a signal processing procedure on an input signal to generate an output signal, performing the signal processing procedure comprising: performing a DPD on the input signal according to a set of DPD coefficients to compensate for a distortion of a power amplifier; and performing a CFR process on the input signal subsequent to performing the DPD; amplifying the output signal via the power amplifier to generate an amplified signal; and transmitting, to a UE, the amplified signal via one or more antennas.

Aspect 2: The method of aspect 1, further comprising: identifying the set of DPD coefficients based at least in part on performing a training process for the DPD.

Aspect 3: The method of aspect 2, wherein performing the training process comprises: transmitting, to the UE, control information indicative of a set of training values comprising a set of CFR parameters associated with performing the CFR process; transmitting, to the UE, a reference signal; and receiving, from the UE, the set of DPD coefficients identified at the UE based at least in part on the set of training values and the reference signal.

Aspect 4: The method of aspect 3, further comprising: receiving, from the UE, control information indicative of a capability of the UE to identify sets of DPD coefficients accounting for the CFR process subsequent to the DPD, wherein performing the training process is based at least in part on the control information.

Aspect 5: The method of any of aspects 3 through 4, further comprising: transmitting, to the UE, an indication of a configured training signal, wherein the reference signal comprises the configured training signal.

Aspect 6: The method of any of aspects 3 through 5, wherein the set of CFR parameters comprises at least one of a polar clipping parameter, a cartesian clipping parameter, a maximal peak power, an input root mean square to the power amplifier, or a target PAPR.

Aspect 7: The method of any of aspects 1 through 6, wherein performing the signal processing procedure comprises: clipping, via applying the CFR process, the output signal to a configured peak power level.

Aspect 8: The method of aspect 7, wherein applying the CFR process is based at least in part on a set of CFR parameters comprising one or more clipping parameters.

Aspect 9: The method of any of aspects 1 through 8, wherein performing the signal processing procedure further comprises: performing a second CFR process prior to the DPD.

Aspect 10: The method of aspect 9, wherein the second CFR process is configured match a CCDF of the input signal and the output signal.

Aspect 11: A method for wireless communications at a UE, comprising: receiving, from a network entity, control information indicative of a set of training values for a DPD associated with the network entity, the set of training values comprising a set of CFR parameters for a CFR process associated with the network entity; receiving, from the network entity, a reference signal; determining a set of DPD coefficients associated with the DPD based at least in part on the set of training values and the reference signal; and transmitting, to the network entity, an indication of the set of DPD coefficients.

Aspect 12: The method of aspect 11, further comprising: transmitting, to the network entity, control information indicative of a capability of the UE to identify sets of DPD coefficients accounting for the CFR process subsequent to the DPD.

Aspect 13: The method of any of aspects 11 through 12, further comprising: receiving, from the network entity, an indication of a configured training signal, wherein the reference signal comprises the configured training signal.

Aspect 14: The method of any of aspects 11 through 13, wherein the set of CFR parameters comprises at least one of a polar clipping parameter, a cartesian clipping parameter, a maximal peak power, an input root mean square to a power amplifier, or a target PAPR.

Aspect 15: The method of any of aspects 11 through 14, further comprising: receiving, from the network entity, a downlink transmission based at least in part on transmitting the indication of the set of DPD coefficients.

Aspect 16: An apparatus for wireless communications at a network entity, comprising a processor; memory coupled with the processor; and instructions stored in the memory and executable by the processor to cause the apparatus to perform a method of any of aspects 1 through 10.

Aspect 17: An apparatus for wireless communications at a network entity, comprising at least one means for performing a method of any of aspects 1 through 10.

Aspect 18: A non-transitory computer-readable medium storing code for wireless communications at a network entity, the code comprising instructions executable by a processor to perform a method of any of aspects 1 through 10.

Aspect 19: An apparatus for wireless communications at a UE, comprising a processor; memory coupled with the processor; and instructions stored in the memory and executable by the processor to cause the apparatus to perform a method of any of aspects 11 through 15.

Aspect 20: An apparatus for wireless communications at a UE, comprising at least one means for performing a method of any of aspects 11 through 15.

Aspect 21: A non-transitory computer-readable medium storing code for wireless communications at a UE, the code comprising instructions executable by a processor to perform a method of any of aspects 11 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a network entity, comprising:
performing a signal processing procedure on an input signal to generate an output signal, performing the signal processing procedure comprising:
performing a digital pre-distortion process on the input signal according to a set of digital pre-distortion coefficients to compensate for a distortion of a power amplifier; and
performing a crest factor reduction process on the input signal subsequent to performing the digital pre-distortion process, wherein the set of digital pre-distortion coefficients are based at least in part on performance of the crest factor reduction process;
amplifying the output signal via the power amplifier to generate an amplified signal; and
transmitting, to a user equipment (UE), the amplified signal via one or more antennas.

2. The method of claim 1, further comprising:
identifying the set of digital pre-distortion coefficients based at least in part on performing a training process for the digital pre-distortion process.

3. The method of claim 2, wherein performing the training process comprises:
transmitting, to the UE, control information indicative of a set of training values comprising a set of crest factor reduction parameters associated with performing the crest factor reduction process;
transmitting, to the UE, a reference signal; and
receiving, from the UE, the set of digital pre-distortion coefficients identified at the UE based at least in part on the set of training values and the reference signal.

4. The method of claim 3, further comprising:
receiving, from the UE, second control information indicative of a capability of the UE to identify sets of digital pre-distortion coefficients accounting for the crest factor reduction process subsequent to the digital pre-distortion process, wherein performing the training process is based at least in part on the control information.

5. The method of claim 3, further comprising:
transmitting, to the UE, an indication of a configured training signal, wherein the reference signal comprises the configured training signal.

6. The method of claim 3, wherein the set of crest factor reduction parameters comprises at least one of a polar clipping parameter, a cartesian clipping parameter, a maximal peak power, an input root mean square to the power amplifier, or a target peak to average power ratio.

7. The method of claim 1, wherein performing the signal processing procedure comprises:
clipping, via applying the crest factor reduction process, the output signal to a configured peak power level.

8. The method of claim 7, wherein applying the crest factor reduction process is based at least in part on a set of crest factor reduction parameters comprising one or more clipping parameters.

9. The method of claim 1, wherein performing the signal processing procedure further comprises:
performing a second crest factor reduction process prior to the digital pre-distortion process.

10. The method of claim 9, wherein the second crest factor reduction process is configured match a complementary cumulative distribution function of the input signal and the output signal.

11. A method for wireless communications at a user equipment (UE), comprising:
receiving, from a network entity, control information indicative of a set of training values for a digital pre-distortion process associated with the network entity, the set of training values comprising a set of crest factor reduction parameters for a crest factor reduction process associated with the network entity;
receiving, from the network entity, a reference signal;
determining a set of digital pre-distortion coefficients associated with the digital pre-distortion process based at least in part on the set of training values and the reference signal; and
transmitting, to the network entity, an indication of the set of digital pre-distortion coefficients.

12. The method of claim 11, further comprising:
transmitting, to the network entity, second control information indicative of a capability of the UE to identify sets of digital pre-distortion coefficients accounting for the crest factor reduction process subsequent to the digital pre-distortion process.

13. The method of claim 11, further comprising:
receiving, from the network entity, an indication of a configured training signal, wherein the reference signal comprises the configured training signal.

14. The method of claim 11, wherein the set of crest factor reduction parameters comprises at least one of a polar clipping parameter, a cartesian clipping parameter, a maximal peak power, an input root mean square to a power amplifier, or a target peak to average power ratio.

15. The method of claim 11, further comprising:
receiving, from the network entity, a downlink transmission based at least in part on transmitting the indication of the set of digital pre-distortion coefficients.

16. An apparatus for wireless communications at a network entity, comprising:
a processor;
memory coupled with the processor; and
instructions stored in the memory and executable by the processor to cause the apparatus to:
perform a signal processing procedure on an input signal to generate an output signal, performing the signal processing procedure comprising:
perform a digital pre-distortion process on the input signal according to a set of digital pre-distortion coefficients to compensate for a distortion of a power amplifier; and
perform a crest factor reduction process on the input signal subsequent to performing the digital pre-distortion process, wherein the set of digital pre-distortion coefficients are based at least in part on performance of the crest factor reduction process;
amplify the output signal via the power amplifier to generate an amplified signal; and
transmit, to a user equipment (UE), the amplified signal via one or more antennas.

17. The apparatus of claim 16, wherein the instructions are further executable by the processor to cause the apparatus to:
identify the set of digital pre-distortion coefficients based at least in part on performing a training process for the digital pre-distortion process.

18. The apparatus of claim 17, wherein the instructions to perform the training process are executable by the processor to cause the apparatus to:

transmit, to the UE, control information indicative of a set of training values comprising a set of crest factor reduction parameters associated with performing the crest factor reduction process;

transmit, to the UE, a reference signal; and receive, from the UE, the set of digital pre-distortion coefficients identified at the UE based at least in part on the set of training values and the reference signal.

19. The apparatus of claim 18, wherein the instructions are further executable by the processor to cause the apparatus to:

receive, from the UE, second control information indicative of a capability of the UE to identify sets of digital pre-distortion coefficients accounting for the crest factor reduction process subsequent to the digital pre-distortion process, wherein performing the training process is based at least in part on the control information.

20. The apparatus of claim 18, wherein the instructions are further executable by the processor to cause the apparatus to:

transmit, to the UE, an indication of a configured training signal, wherein the reference signal comprises the configured training signal.

21. The apparatus of claim 18, wherein the set of crest factor reduction parameters comprises at least one of a polar clipping parameter, a cartesian clipping parameter, a maximal peak power, an input root mean square to the power amplifier, or a target peak to average power ratio.

22. The apparatus of claim 16, wherein the instructions to perform the signal processing procedure are executable by the processor to cause the apparatus to:

clip, via applying the crest factor reduction process, the output signal to a configured peak power level.

23. The apparatus of claim 22, wherein applying the crest factor reduction process is based at least in part on a set of crest factor reduction parameters comprising one or more clipping parameters.

24. The apparatus of claim 16, wherein the instructions to perform the signal processing procedure are further executable by the processor to cause the apparatus to:

perform a second crest factor reduction process prior to the digital pre-distortion process.

25. The apparatus of claim 24, wherein the second crest factor reduction process is configured match a complementary cumulative distribution function of the input signal and the output signal.

26. An apparatus for wireless communications at a user equipment (UE), comprising:

a processor;

memory coupled with the processor; and instructions stored in the memory and executable by the processor to cause the apparatus to:

receive, from a network entity, control information indicative of a set of training values for a digital pre-distortion process associated with the network entity, the set of training values comprising a set of crest factor reduction parameters for a crest factor reduction process associated with the network entity;

receive, from the network entity, a reference signal;

determine a set of digital pre-distortion coefficients associated with the digital pre-distortion process based at least in part on the set of training values and the reference signal; and transmit, to the network entity, an indication of the set of digital pre-distortion coefficients.

27. The apparatus of claim 26, wherein the instructions are further executable by the processor to cause the apparatus to:

transmit, to the network entity, second control information indicative of a capability of the UE to identify sets of digital pre-distortion coefficients accounting for the crest factor reduction process subsequent to the digital pre-distortion process.

28. The apparatus of claim 26, wherein the instructions are further executable by the processor to cause the apparatus to:

receive, from the network entity, an indication of a configured training signal, wherein the reference signal comprises the configured training signal.

29. The apparatus of claim 26, wherein the set of crest factor reduction parameters comprises at least one of a polar clipping parameter, a cartesian clipping parameter, a maximal peak power, an input root mean square to a power amplifier, or a target peak to average power ratio.

30. The apparatus of claim 26, wherein the instructions are further executable by the processor to cause the apparatus to:

receive, from the network entity, a downlink transmission based at least in part on transmitting the indication of the set of digital pre-distortion coefficients.

* * * * *